United States Patent [19]

Wisneski et al.

[11] Patent Number: 4,663,220
[45] Date of Patent: May 5, 1987

[54] POLYOLEFIN-CONTAINING EXTRUDABLE COMPOSITIONS AND METHODS FOR THEIR FORMATION INTO ELASTOMERIC PRODUCTS INCLUDING MICROFIBERS

[75] Inventors: Tony J. Wisneski, Kimberly, Wis.; Michael T. Morman, Alpharetta, Ga.

[73] Assignee: Kimberly-Clark Corporation, Neenah, Wis.

[21] Appl. No.: 760,698

[22] Filed: Jul. 30, 1985

[51] Int. Cl.$^4$ ............................................. D04H 1/58
[52] U.S. Cl. .................................... 428/221; 428/224; 428/288; 428/903
[58] Field of Search ................ 428/288, 903, 221, 224

[56] References Cited

U.S. PATENT DOCUMENTS

| | | | |
|---|---|---|---|
| 2,957,512 | 10/1960 | Wade | 428/284 |
| 3,459,830 | 8/1969 | Legge et al. | 260/876 |
| 3,459,831 | 8/1969 | Luftglass et al. | 260/876 |
| 3,505,271 | 4/1970 | Brown | 260/336 |
| 3,506,740 | 4/1970 | Dempsey | 260/876 |
| 3,509,056 | 4/1970 | Shepherd | 252/59 |
| 3,678,134 | 7/1972 | Middlebrook | 260/876 B |
| 3,686,364 | 8/1972 | Robinson | 424/33 |
| 3,825,380 | 7/1974 | Harding | 425/72 |
| 3,849,241 | 11/1974 | Butin | 264/210 F |
| 3,855,135 | 12/1974 | Newingham | 252/15 |
| 3,993,613 | 11/1976 | Doss | 260/27 BB |
| 4,100,324 | 7/1978 | Anderson | 428/288 |
| 4,197,377 | 4/1980 | Bohm | 525/233 |
| 4,250,273 | 2/1981 | Bohm et al. | 525/99 |
| 4,252,764 | 2/1981 | Tokas | 264/142 |
| 4,259,220 | 3/1981 | Bunnelle | 515/98 |
| 4,296,163 | 10/1981 | Emi | 428/212 |
| 4,305,990 | 12/1981 | Kelly | 428/220 |
| 4,323,534 | 4/1982 | Des Marais | 264/49 |
| 4,355,425 | 10/1982 | Jones | 2/402 |
| 4,413,623 | 11/1983 | Pieniak | 156/160 |
| 4,418,123 | 11/1983 | Bunnelle | 428/517 |
| 4,450,026 | 5/1984 | Pieniak | 156/164 |
| 4,485,062 | 11/1984 | Dawes | 264/171 |

FOREIGN PATENT DOCUMENTS 54103466  2/1976  Japan.
54106620  1/1978  Japan.
5590663  12/1978  Japan.

OTHER PUBLICATIONS

Page 80 of Notebook, p. 347.
Material Safety Data Sheet 2,136.
Material Safety Data Sheet 2,031-1.
Superfine Thermoplastic Fibers, Van A. Wente, Ind. & Eng. Chem., pp. 1342-1346.
Manufacture of Superfine Organic Fibers, V. A. Wente, E. L. Boone, NRL Dept. 4364 (111437), 4/15/54.
Shell Technical Bulletin SC 607-84, Kraton GX1657 Thermoplastic Rubber.
Shell Technical Bulletin SC: 455-81, Kraton Thermoplastic Rubber, Processing & Fabricating.
Shell Technical Bulletin SC 198-83, Kraton Thermoplastic Rubber, An Extremely Versatile...
Shell Technical Bulletin SC: 165-77, Shell Kraton Rubber for Modification of Thermo...
Shell Technical Bulletin SC: 72-85, Solution Behavior of Kraton Thermoplastic Rubber.
Shell Technical Bulletin SC: 68-85, Typical Properties, 1985.
Shell Technical Bulletin SC: 40-83, Kraton G2705 Thermoplastic Rubber.
Shell Technical Bulletin SC: 37-85, Kraton G1652 Thermoplastic Rubber.
Shell Technical Bulletin SC: 38-82, Kraton G1650 Thermoplastic Rubber.

*Primary Examiner*—James J. Bell
*Attorney, Agent, or Firm*—Joseph P. Harps

[57] ABSTRACT

The disclosure is generally directed to an extrudable elastomeric composition formed by blending from at least 10 percent, by weight, of an A-B-A' block copolymer where "A" and "A'" are each a thermoplastic endblock which includes a styrenic moiety and where "B" is an elastomeric poly(ethylene-butylene) midblock with up to at least about 90 percent, by weight, of at least one polyolefin which, when blended with the A-B-A' block copolymer and subjected to an effective combination of elevated temperature and elevated pressure conditions, is adapted to be extruded in blended form, with the A-B-A' block copolymer. Fibrous nonwoven elastomeric webs may be formed from the extrudable composition and processes for forming the fibrous nonwoven elastomeric webs are also disclosed.

50 Claims, 5 Drawing Figures

POLYOLEFIN-CONTAINING EXTRUDABLE COMPOSITIONS AND METHODS FOR THEIR FORMATION INTO ELASTOMERIC PRODUCTS INCLUDING MICROFIBERS

FIELD OF THE INVENTION

The present invention is generally directed to certain extrudable elastomeric compositions and methods for forming the extrudable elastomeric compositions into elastomeric products such as, for example, fibrous nonwoven elastomeric webs.

BACKGROUND OF THE INVENTION

Meltblowing techniques for forming very small diameter fibers, sometimes referred to as microfibers or meltblown fibers, from thermoplastic resins are well-known in the art. For example, the production of fibers by meltblowing is described in an article entitled "Superfine Thermoplastic Fibers", appearing in *Industrial and Engineering Chemistry*, Vol. 48, No. 8, pp. 1342-1346. This article describes work done at the Naval Research Laboratories in Washington, D.C. Another publication dealing with meltblowing is *Naval Research Laboratory Report* 111437, dated Apr. 15, 1954. Generally, meltblowing techniques include heating a thermoplastic fiber-forming resin to a molten state and extruding the molten resin from a die arrangement having a plurality of linearly arranged small diameter capillaries as molten threads. The molten threads exit the die into a high velocity stream of gas, usually air, which is maintained at an elevated temperature, and which serves to attenuate the threads of molten resin to form fibers having a diameter which is less than the diameter of the capillaries of the die arrangement.

U.S. Pat. No. 3,894,241 to Butin, the disclosure of which is hereby incorporated by reference, discloses the manufacture of nonwoven mats by meltblowing and describes, at column 4, line 57, et. seq., the formation of meltblown fibers having diameters of from about 0.5 to about 400 microns by extruding degraded fiber-forming molten thermoplastic polymer resins as molten threads into an attenuating gas stream. Also disclosed is the fact that the diameter of the attenuated fibers will decrease as the gas flow of the attenuating gas through the gas outlets, which are located on either side of the die tip extrusion capillaries, increases. It is also stated that, at low to moderate attenuating gas velocities, the extruded molten threads, even after attenuation by the gas into fibers, remain essentially continuous with little or no fiber breakage and that fibers produced in such an arrangement have diameters of, preferably, from about 8 to 50 microns. Prior to extrusion the fiber-forming thermoplastic polymer resins are subjected to controlled thermal and oxidative degradation at temperatures ranging from about 550 degrees Fahrenheit to about 900 degrees Fahrenheit, that is from about 288 degrees Centigrade to about 482 degrees Centigrade, preferably from about 600 degrees Fahrenheit to 750 degrees Fahrenheit, that is from about 316 degrees Centigrade to about 399 degrees Centigrade, to effect a requisite degradation of the resin which reduces the viscosity of the fiber-forming resin. Typical fiber-forming thermoplastic resins are listed at column 4, line 35 et. seq. and commercially useful resin throughput rates are stated to be from about 0.07 to 5 grams per minute per die extrusion capillary, preferably at least 1 gram per minute per die extrusion capillary.

While degradation of some thermoplastic resins prior to their extrusion may be necessary in order to reduce their viscosity sufficiently to allow their extrusion and attenuation by the high velocity stream of attenuating gas, there is a limit to the degree of degradation prior to extrusion which can be imposed on a given resin without adversely affecting the properties of the extruded product. For example, excessive degradation of polymeric elastomeric polystyrene/poly(ethylene-butylene)/polystyrene block copolymer resins, may result in the formation of a non-elastic resin. It is believed that the degraded material is non-elastic because the block copolymer resin degrades to form a di-block copolymer resin. Other dangers may be associated with high degradation temperatures. For example, Technical Bulletins SC: 38-82 and SC: 39-85 of The Shell Chemical Company of Houston, Tex., in describing polystyrene/poly(ethylene-butylene)/polystyrene elastomeric block copolymer resins sold by it under the trademark KRATON state that, with respect to the KRATON G 1650 and KRATON G 1652, both of which are block copolymer resins, compounding temperatures of the resin should not be allowed to exceed 525 degrees Fahrenheit, that is 274 degrees Centigrade and that a fire watch should be maintained if the temperature of the resins reaches 475 degrees Fahrenheit, that is 246 degrees Centigrade. With respect to the KRATON GX 1657 block copolymer resin, Shell Technical Bulletin SC: 607-84 gives a warning not to allow the temperature of the block copolymer resin to exceed 450 degrees Fahrenheit, that is 232 degrees Centigrade, and to maintain a fire watch should that temperature be reached. Shell Material Safety Data Sheet designated as MSDS number 2,136 states, with respect to KRATON G-1657 thermoplastic rubber, that the processing temperature of the material should not be allowed to exceed 550 degrees Fahrenheit and that a fire watch should be maintained if that temperature is reached. A Shell Material Safety Data Sheet designated as MSDS 2,031-1 states, with respect to KRATON G-1652 thermoplastic rubber, that the processing temperature of the material should not exceed 550 degrees Fahrenheit and that a fire watch should be maintained if that temperature is reached. Shell Chemical Company Technical Bulletins SC: 68-85 "KRATON Thermoplastic Rubber" and SC: 72-85 "Solution Behavior of KRATON Thermoplastic Rubbers" give detailed information concerning various thermoplastic block copolymer resins which may be obtained from Shell under the trade designation KRATON. The KRATON thermoplastic resins are stated by Shell to be A-B-A block copolymers in which the "A" endblocks are polystyrene and the "B" midblock is, in KRATON G resins, poly(ethylene-butylene) or, in KRATON D resins, either polyisoprene or polybutadiene.

Shell Chemical Company Technical Bulletin SC: 198-83, at page 19, gives examples of commercially available resins and plasticizers useable with KRATON rubber resins. The Bulletin distinguishes between rubber phase, B midblock, associating materials and polystyrene phase, A endblock, associating materials. Among the rubber phase associating materials is a group of resins which are identified as "Polymerized Mixed Olefin" and a plasticizer identified as "Wingtrack 10" having a chemical base of "mixed olefin".

For quite some time those in the art have been attempting to form elastomeric resins into fibrous nonwoven elastomeric webs. In fact, the prior art reveals that experimentation with KRATON G 1650 and KRATON G 1652 brand materials has occurred. For example, U.S. Pat. No. 4,323,534 to des Marais discloses that it was concluded by those in the art that the KRATON G rubber resins are too viscous to be extruded alone without substantial melt fracture of the product. However, des Marais does disclose a process which utilizes blended KRATON G 1650 and KRATON G 1652 resins in the formation of fibrous nonwoven webs and films. In order to overcome the stated viscosity problem the KRATON G 1650 block or KRATON G 1652 copolymer resin was blended with about 20 percent to 50 percent, by weight, of a fatty chemical such as stearic acid prior to extrusion and meltblowing. An extrusion temperature range of 400 to 460 degrees Fahrenheit is disclosed at column 8, line 64 et. seq. and this temperature range is generally within that recommended by the above-mentioned Shell Chemical Company technical bulletins. Unfortunately, the physical properties of the product obtained by this process, for example, a nonwoven mat of meltblown fibers, were apparently unsatisfactory because, after formation of the nonwoven web, substantially all the fatty chemical is leached out of the nonwoven web of extruded microfibers by soaking the web in alcohols having a good ability to solubilize the fatty chemical utilized. In one embodiment, discussed at column 3, lines 8 and 9, the thermoplastic rubber resin is an A-B-A' block copolymer wherein B is poly(ethylene-butylene) and A and A' are selected from the group including polystyrene and poly(alpha-methylstyrene).

U.S. Pat. No. 4,305,990 to Kelly discloses that A-B-A block copolymers having a polybutadiene or polyisoprene midblock and polystyrene endblocks may be extruded as films when blended with an amount of amorphous polyproylene sufficient to enhance the processability of the blend. It is stated in the abstract that the films retain their elastomeric properties and are significantly more processable owing to the presence of the amorphous polypropylene.

Another patent apparently dealing with subject matter stemming from or at least related to the subject matter disclosed in des Marais in U.S. Pat. No. 4,355,425 to Jones which discloses an undergarment that may be made of a fiber formed by meltblowing a blend of a KRATON G rubber with stearic acid. The examples are apparently limited to KRATON G-1652 block copolymers. An extrudable composition, which is stated to be particularly useful at column 4, line 24 et. seq., is a blend of KRATON G 1652 rubber and 20 percent by weight stearic acid as well as minor amounts of other materials. An extrusion temperature of 390 degrees Fahrenheit for the blend of KRATON G 1652 rubber and stearic acid, which is disclosed at column 5, lines 14 and 19, is within the temperature range set forth in the above-mentioned Shell Chemical Company technical bulletins. It is further stated that fibers for making the material can be meltblown as taught in U.S. Pat. No. 3,825,380, to Harding which is said to disclose a die configuration suited for meltblowing the fibers. It should also be noted that the procedures of Jones, as was the case with the procedure of des Marais, indicate the desirability of leaching out the fatty chemical after formation of a fibrous nonwoven web or film from the blend of fatty chemical and KRATON G. See, for example, column 5, lines 60 et seq.

SUMMARY OF THE INVENTION

The present invention overcomes the above-discussed difficulties which have been encountered by those in the art when attempting to form elastomeric A-B-A' block copolymer materials into elastomeric products by providing extrudable elastomeric compositions which, after extrusion, solidify to form elastomeric products such as, for example, fibrous nonwoven elastomeric webs. For example, leaching of materials out of the fibrous nonwoven web or other elastomeric products formed from the extrudable compositions of the present invention is avoided. The extrudable elastomeric compositions are blends of (1) from at least about 10 percent, by weight, of an A-B-A' block copolymer, where "A" and "A'" are each a thermoplastic polymer endblock which includes a styrenic moiety such as a poly(vinyl arene) and where "B" is an elastomeric poly(ethylene-butylene) midblock, with (2) from greater than 0 percent, by weight, to about 90 percent, by weight, of a polyolefin which, when blended with the A-B-A' block copolymer and subjected to appropriate elevated pressure and elevated temperature conditions, is extrudable, in blended form, with the A-B-A' block copolymer. The A-B-A' block copolymer serves to mpart elastomeric properties to products formed from the extrudable composition and the presence of the polyolefin in the blend serves to reduce the viscosity of the composition as compared to the viscosity of the neat, i.e. pure A-B-A' block copolymer and thus enhances the extrudability of the composition.

Preferably, the A and A' thermoplastic styrenic moiety containing endblocks of the block copolymer are selected from the group including polystyrene and polystyrene homologs such as, for example, poly(alpha-methylstyrene). In some embodiments the A and A' thermoplastic styrenic moiety containing endblocks are identical. Preferably, the polyolefin is selected from the group including at least one polymer selected from the group including polyethylene, polypropylene, polybutene, ethylene copolymers, propylene copolymers, butene copolymers or blends of two or more of these materials.

The blend usually includes from at least about 20 percent, by weight, to about 95 percent, by weight, of the block copolymer and from at least about 5 percent, by weight, to about 80 percent, by weight, of the polyolefin. For example, the blend may include from about 30 percent, by weight, to about 90 percent, by weight, of the block copolymer and from about 10 percent, by weight, to about 70 percent, by weight, of the polyolefin. Preferably, the blend includes from about 50 percent, by weight, to about 90 percent, by weight, of the block copolymer and from about 10 percent, by weight, to about 50 percent, by weight, of the polyolefin. For example, the blend may include from about 50 percent, by weight, to about 70 percent, by weight, of the block copolymer and from about 30 percent, by weight, to about 50 percent, by weight, of the polyolefin. One blend includes about 60 percent, by weight, of the block copolymer and about 40 percent, by weight, of the polyolefin.

The extrudable composition is extruded or otherwise formed such as, for example, by molding, for example, injection molding, at an appropriate, that is effective, combination of elevated pressure and elevated temperature conditions. These conditions will vary depending on the polyolefin utilized. For example, the extrudable composition should be extruded or otherwise formed at a temperature of at least about 125 degrees Centigrade if polyethylene is utilized as the polyolefin in the blend or at least about 175 degrees Centigrade if polypropylene is utilized in the blend, for example, at a temperature of from at least about 290 degrees Centigrade to about 345 degrees Centigrade, more specifically, at a temperature of from at least about 300 degrees Centigrade to about 335 degrees Centigrade, into elastomeric products such as, for example, elastomeric fibers, which may be collected as a fibrous nonwoven elastomeric web.

Preferably the blends are extrudable within the above-defined temperature ranges at elevated pressures within the die tip, (for example, within the extrusion capillaries of a die tip having thirty (30) extrusion capillaries per lineal inch of die tip with each of the capillaries having a diameter of 0.0145 inches and a length of 0.113 inches,) of no more than about 300 pounds per square inch, gage, for example, from pressures of from about 20 pounds per square inch, gage to about 250 pounds per square inch, gage. More specifically, the blends are extrudable within the above-defined temperature ranges at pressures of from about 50 pounds per square inch, gage to about 250 pounds per square inch, gage, for example, from about 125 pounds per square inch, gage to about 225 pounds per square inch, gage. Higher elevated pressures can be utilized with other die designs having a lower number of capillaries per inch of die, but, generally speaking, lower production rates result.

Importantly, it has been found that the extrudable compositions of the present invention, when treated in accordance with the method of the present invention, are extrudable at satisfactory throughput rates because the presence of the polyolefin in the extrudable composition reduces the viscosity of the extrudable composition, as compared to the viscosity of the neat, i.e. pure, block copolymer, to satisfactory levels. This reduced viscosity proportionally reduces the die tip pressure if all other parameters remain the same. For example, the viscosity of the extrudable compositions will generally be less than about 500 poise when extruded at the above-defined elevated temperature and elevated pressure ranges. Preferably, the viscosity of the extrudable composition is less than about 300 poise when extruded at the above-defined elevated temperature and elevated pressure ranges. For example, the viscosity of the extrudable composition may be from at least about 100 poise to about 200 poise when extruded at the above-identified elevated temperature and elevated pressure conditions.

Because the polyolefin reduces the viscosity of the blend, as compared to the viscosity of the block copolymer, the extrudable composition is extrudable within the above-identified elevated temperature and elevated pressure ranges, through a die tip having, for example, thirty capillaries per inch of die tip with the capillaries having a diameter of about 0.0145 inches and a length of about 0.113 inches at a rate of from at least about 0.02 grams per capillary per minute to about 1.7 or more grams per capillary per minute. For example, the extrudable composition may be extruded through the above-identified die tip having capillaries with a diameter of about 0.0145 inches and a length of about 0.113 inches at the rate of from at least about 0.1 grams per capillary per minute to about 1.25 grams per capillary per minute. Preferably, the extrudable composition is extrudable through the above-identified die tip having capillaries with a diameter of about 0.0145 inches and a length of about 0.113 inches at the rate of from at least about 0.3 grams per capillary per minute to about 1.1 grams per capillary per minute.

The extrudable composition may be formed into a variety of products such as, for example, fibrous nonwoven elastomeric webs preferably having microfibers with an average diameter of not greater than about 100 microns, and preferably having an average basis weight of not more than about 300 grams per square meter, for example, an average basis weight of from about 5 grams per square meter to about 100 grams or more per square meter. More specifically, an average basis weight of from about 10 grams per square meter to about 75 grams per square meter. For example, a fibrous nonwoven elastomeric web may be formed by extruding the extrudable composition at an appropriate, i.e. effective, combination of elevated temperature and elevated pressure conditions. Preferably, the extrudable composition is extruded at a temperature of from at least about 125 degrees Centigrade if the polyolefin is a polyethylene or at least about 175 degrees Centigrade if the polyolefin is polypropylene, for example, from about 290 degrees Centigrade to about 345 degrees Centigrade, more specifically from about 300 degrees Centigrade to about 335 degrees Centigrade. Preferably, the extrudable composition is extruded within the above-identified temperature ranges at pressures, within the die tip, (for example, within the extrusion capillaries of a die tip having thirty (30) extrusion capillaries per lineal inch of die tip with each of the capillaries having a diameter of 0.0145 inches and a length of 0.113 inches,) of no more than about 300 pounds per square inch, gage, for example, from about 20 pounds per square inch, gage to about 250 pounds per square inch, gage. More specifically, the extrudable composition is extruded at a pressure within the capillaries of the above-identified die tip of from about 50 pounds per square inch, gage to about 250 pounds per square inch, gage, for example, from about 125 pounds per square inch, gage to about 225 pounds per square inch, gage.

In the formation of elastomeric nonwoven webs, the extrudable composition is extruded, at the above-defined elevated temperature and elevated pressure conditions at a rate of from at least about 0.02 gram per capillary per minute to about 1.7 or more grams per capillary per minute, for example, from at least about 0.1 gram per capillary per minute to about 1.25 grams per capillary per minute, more specifically, from at least about 0.3 gram per capillary per minute to about 1.1 grams per capillary per minute, through a die having a plurality of small diameter extrusion capillaries as molten threads into a gas stream which attenuates the molten threads to provide a gas-borne stream of microfibers which are then formed into the fibrous nonwoven elastomeric web upon their deposition on a collecting arrangement. The attenuating gas stream is applied to the molten threads at a temperature of from at least about 100 degrees Centigrade to about 400 degrees Centigrade, for example, from about 200 degrees Centigrade to about 350 degrees Centigrade and at a pressure of from at least about 0.5 pound per square inch, gage to about 20 pounds per square inch, gage, for example, from at least about 1 pound per square inch, gage to about 10 pounds per square inch, gage. The thread attenuating gas stream may be an inert, non-oxidizing, gas stream such as, for example, a stream of nitrogen gas. In some embodiments the velocity and temperature of the thread-attenuating gas stream is adjusted so that the fibers are collected as substantially continuous fibers having diameters of from about ten (10) microns to about sixty (60) microns, for example, from at least about ten (10) microns to about forty (40) microns. In accordance with the present invention, the fibrous nonwoven elastomeric webs so formed will include elastomeric fibers composed of from at least about 10 percent, by weight, of the block copolymer and greater than 0 percent, by weight, and up to about 90 percent, by weight, of the polyolefin. The fibers are usually composed of from at least about 20 percent, by weight, to about 95 percent, by weight, of the block copolymer and from at least about 5 percent, by weight, to about 80 percent, by weight of the polyolefin. For example, the fibers may be composed of from at least about 30 percent, by weight, to about 90 percent, by weight, of the block copolymer and from at least about 10 percent, by weight, to about 70 percent, by weight, of the polyolefin. Preferably, the fibers are composed of from about 50 percent, by weight, to about 90 percent, by weight, of the block copolymer and from at least about 10 percent, by weight, to about 50 percent, by weight, of the polyolefin. For example, the fibers may be composed of from at least about 50 percent, by weight, to about 70 percent, by weight, of the block copolymer and from at least about 30 percent, by weight, to about 50 percent, by weight, of the polyolefin. Examplary fibrous nonwoven elastomeric webs have been formed from fibers composed of about 60 percent, by weight, of the block copolymer and about 40 percent, by weight, of the polyolefin.

Still other aspects of the present invention will become apparent to those skilled in the art upon review of the following detailed disclosure.

DEFINITIONS

The term "elastic" and "elastomeric" are used interchangeably herein to mean any material which, upon application of a biasing force, is stretchable to a stretched, biased length which is at least about 125 percent, that is about one and one quarter, of its relaxed, unbiased length, and which, will recover at least 40 percent of its elongation upon release of the stretching, elongating force. A hypothetical example which would satisfy this definition of an elastomeric material would be a one (1) inch sample of a material which is elongatable to at least 1.25 inches and which, upon being elongated to 1.25 inches and released, will recover to a length of not more than 1.15 inches. Many elastic materials may be stretched by much more than 25 percent of their relaxed length and many of these will recover to substantially their original relaxed length upon release of the stretching, elongating force and this later class of materials is generally preferred for purposes of the present invention.

As used herein the term "recover" refers to a contraction of a stretched material upon termination of a biasing force following stretching of the material by appalication of the biasing force. For example, if a material having a relaxed, unbiased length of one (1) inch was elongated 50 percent by stretching to a length of one and one half (1.5) inches the material would have been elongated 50 percent and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its elongation.

The term "microfibers" is used herein to refer to small diameter fibers having an average diameter not greater than about 100 microns, preferably having a diameter of from about 0.5 microns to about 50 microns, more preferably having an average diameter of from about 4 microns to about 40 microns and which may be made by extruding a molten thermoplastic material through a plurality of small diameter, usually circular, die capillaries as molten threads and attenuating the molten threads by application of a high velocity gas, usually air, stream to reduce their diameter to the range stated above.

As used herein the term "nonwoven web" means a web of material which has been formed without use of weaving processes which produce a structure of individual fibers or threads which are interwoven in an identifiable repeating manner. Nonwoven webs have been, in the past, formed by a variety of processes such as, for example, meltblowing processes, spunbonding processes, film aperturing processes and staple fiber carding processes.

As used herein the term "styrenic moiety" refers to the monomeric unit represented by the formula:

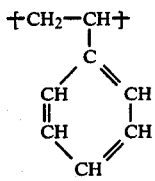

As used herein the term "poly(ethylene-butylene)" refers to a polymer segment represented by the formula:

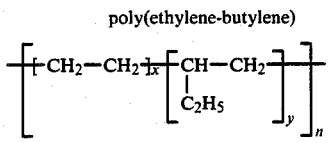

where x, y and n are positive integers.

As used herein the term "polystyrene" refers to a polymer segment represented by the formula:

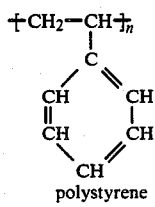

polystyrene where n is a positive integer.

Unless specifically set forth and defined or otherwise limited, the terms "polymer" or "polymer resin" as used herein generally include, but are not limited to, homopolymers, copolymers, such as, for example, block, graft, random and alternating copolymers, terpolymers, etc. and blends and modifications thereof. Furthermore, unless otherwise specifically limited, the terms "polymer" or "polymer resin" shall include all possible geometrical configurations of the material. These configurations include, but are not limited to, isotatic, syndiotactic and random symmetries.

As used herein the term "viscosity" refers to a value which has been calculated by utilizing the well-known Hagen-Poiseuille equation:

$$\text{viscosity} = \frac{(pi)(\text{delta } P)(R^4)D}{8QL}$$

where
pi = 3.14 . . .
delta P = the pressure drop through an extrusion capillary.
R = the radius of the extrusion capillary.
Q = the volume rate of extrusion (through-put) through the extrusion capillary.
L = the length of the extrusion capillary.
D = the density of the molten polymer, assumed in all cases herein to be 0.8 grams per cubic centimeter.

As used herein an "inert" attenuating gas is a non-oxidizing gas which does not degrade the material being meltblown.

As used herein the term "consisting essentially of" does not exclude the presence of additional materials which do not significantly affect the elastic properties and characteristics of a given composition. Exemplary materials of this sort would include, without limitation, pigments, antioxidants, stabilizers, surfactants, waxes, flow promoters, solid solvents, particulates and materials added to enhance processability of the composition.

DESCRIPTION OF THE PREFERRED EMBODIMENTS

Figure 1:
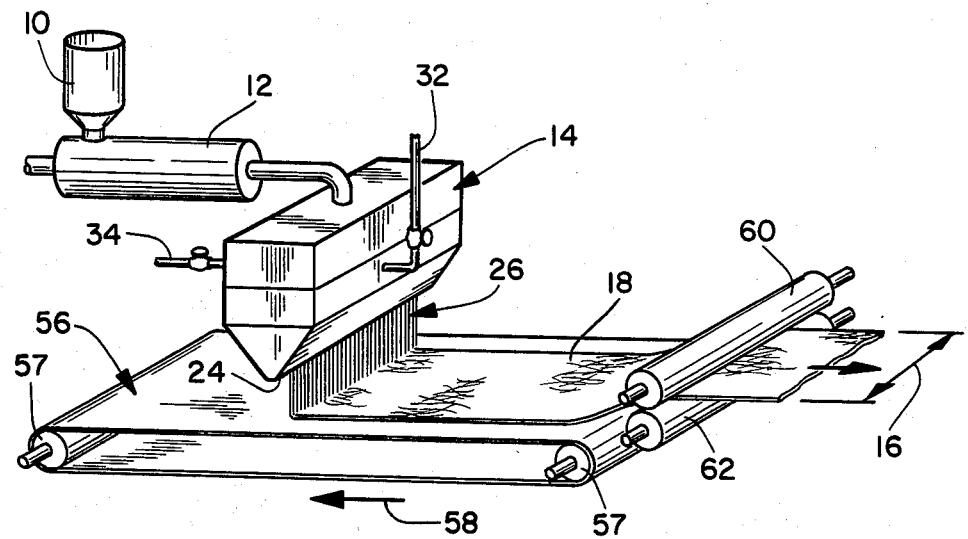
FIG. 1 is a perspective schematic view illustrating one embodiment of a process for forming a nonwoven elastomeric web in accordance with the present invention.

The methods and extrudable compositions of the present invention have broad application in the formation of elastomeric materials such as elastomeric fibers which may be formed into elastomeric webs or other products, by suitable methods such as, for example, extrusion or molding processes. A particularly preferred method, however, is to meltblow fibers to form a fibrous nonwoven elastomeric web.

Meltblowing processes generally involve extruding a thermoplastic polymer resin through a plurality of small diameter capillaries of a meltblowing die as molten threads into a heated gas stream which is flowing generally in the same direction as that of the extruded threads so that the extruded threads are attenuated, i.e., drawn or extended, to reduce their diameter to fiber or preferably microfiber size. The thus formed microfibers are then borne away from the vicinity of the die by the gas stream. The gas stream is directed onto a foraminous member, such as a screen belt or a screen drum which is moving over a vacuum box, so that the gas-borne fibers impinge upon and are collected on the surface of the foraminous member and form a cohesive fibrous nonwoven web. Meltblowing die arrangements usually extend across the foraminous collecting member in a direction which is substantially transverse to the direction of movement of the collecting surface. The die arrangements include a plurality of small diameter capillaries arranged linearly along the transverse extent of the die with the transverse extent of the die being approximately ads long as the desired width of the fibrous nonwoven web which is to be produced. That is, the transverse dimension of the die is the dimension which is defined by the linear array of the capillaries. Typically, the diameter of the capillaries will be on the order of from about 0.01 inches to about 0.02 inches, for example, from about 0.0145 to about 0.018 inches. From about 5 to about 50 such capillaries will be provided per linear inch of die face. Typically, the length of the capillaries will be from about 0.05 inches to about 0.20 inches, for example, about 0.113 inches to about 0.14 inches long. A meltblowing die can extend for from about 30 inches to about 60 or more inches in length in the transverse direction. As a result of the above-discussed linear capillary configuration meltblowing dies, in the vicinity of the capillaries, are usually held together only by a thin and relatively fragile portion of metal which remains between the adjacent capillaries. Consequently, controlling the viscosity of the molten thermoplastic polymer resin as it is extruded through the capillaries is important because the die will rupture or otherwise break if subjected to extreme pressure. It is therefore generally preferred, at least for many such dies, that the extrusion pressure of the molten thermoplastic polymer in the die tip capillaries not exceed more than about 300 pounds per square inch, gage (psi,g), more specifically not more than about 200 psi,g.

As has been stated by those in the art in the above-discussed patents to des Marais and Jones, the viscosity of KRATON G brand A-B-A' block copolymers is so great that extrusion of these materials, in pure or neat form, within the typical extrusion temperature and pressure rannges stated therein is, for all practical purposes, very difficult, if not impossible, without melt fracture of the composition. In attempting to overcome the difficulties of extruding neat KRATON G brand materials des Marais and Jones appear to have discovered that the the use of a blend of a fatty chemical with elastomeric A-B-A' rubber resins, of the type sold under the trademark KRATON G by the Shell Chemical Company, facilitated extrusion of the KRATON G materials. However, they also state that, in order to achieve desirable properties in the film or the web of meltblown fibers obtained from this blend, it was necessary to leach out the fatty chemical from the extruded product.

In contrast to such teachings, it has now been found that a blend of from greater than 0 percent, by weight, to about 90 percent, by weight, of one or more polyolefins with from at least about 10 percent, by weight, of certain A-B-A' elastomeric resins can be extruded and meltblown under appropriate, i.e. effective, elevated temperature and elevated pressure conditions to provide satisfactory elastomeric materials such as elastomeric films and elastomeric fibrous nonwoven webs. Preferably the material is extruded through the die capillaries at a temperature of at least about 125 degrees Centigrade if polyethylene is utilized as the polyolefin in the blend or at least about 175 degrees Centigrade if a polypropylene is utilized as the polyolefin in the blend, for example at a temperature of from at least about 290 degrees Centigrade to about 345 degrees Centigrade, more specifically from a temperature of from at least about 300 degrees Centigrade to about 335 degrees Centigrade.

The A-B-A' elastomeric materials which may be utilized generally include A-B-A' block copolymers where A and A' are each a thermoplastic polymer endblock which contains a styrenic moiety such as, for example, a poly(vinyl arene) where, in some embodiments, A may be the same thermoplastic polymer endblock as A', and where B is an elastomeric poly(ethylene-butylene) polymer midblock. Preferably, the A and A' endblocks are selected from the group of materials including polystyrene or polystyrene homologs such as, for example, poly(alpha-methylstyrene). Materials of this general type, that is KRATON G 1650 and KRATON G 1652, are disclosed in U.S. Pat. Nos. 4,323,534 to des Marais and 4,355,425 to Jones and in the aforementioned Shell brochures which also disclose KRATON GX 1657. Commercially available elastomeric A-B-A' block copolymers having a saturated or essentially saturated poly(ethylene-butylene) midblock "B" represented by the formula:

poly(ethylene-butylene)

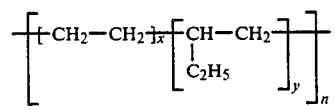

where x, y and n are positive integers and polystyrene endblocks "A" and "A'" each represented by the formula:

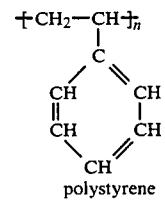

polystyrene where n is a positive integer which may be of the same or a different integer for the A and A' endblocks, are sometimes referred to as S-EB-S block copolymers and are available under the trade designation KRATON G, for example, KRATON G 1650, KRATON G 1652 and KRATON GX 1657, from the Shell Chemical Company.

A summary of the typical properties, as published by the Shell Chemical Company, of the above-identified KRATON G resins at 74 degrees Fahrenheit is presented below in Table I.

TABLE I

| PROPERTY | KRATON G | | |
|---|---|---|---|
| | G-1650 | G-1652 | GX-1657 |
| Tensile Strength, psi[1] | 5,000[2] | 4,500[2] | 3,400[2] |
| 300% Modulus, psi[1] | 800 | 700 | 350 |
| Elongation, %[1] | 500 | 500 | 750 |
| Set at Break, % | — | — | — |
| Hardness, Shore A | 75 | 75 | 65 |
| Specific Gravity | 0.91 | 0.91 | 0.90 |
| Brookfield Viscosity, (Toluene Solution) cps at 77° F. | 1,500[3] | 550[3] | 1,200[3] |
| Melt Viscosity, Melt Index, Condition G, gms/10 min. | — | — | — |
| Plasticizer Oil Content, % w | 0 | 0 | 0 |
| Sytrene/Rubber[4] Ratio | 28/72 | 29/71 | 14/86 |
| Physical Form | Crumb | Crumb | Pellet |

[1] ASTM method D412-tensile test jaw separation speed 10 in./min.
[2] Typical properties determined on film cast from atoluene solution.
[3] Neat polymer concentration, 20% w.
[4] The ratio of the sum of the molecular weights of the endblocks (A + A') to themolecular weight of the B midblock. For example, with respect to KRATON G-1650, the sum of the molecular weights of the twoendblocks (A + A') is 28 percent of the molecular weight of the A-B-A' block copolymer.

Generally, the block copolymer resin must be one which is free of polymer segments which chain scission or which crosslink at the temperatures utilized by the process of the present invention because such materials will either tend to plug up the small diameter capillaries through which the molten extrudable composition must be extruded or will overly degrade and form unsatisfactory product. Surprisingly, it has been found that, even at high polyolefin contents, fibrous nonwoven webs having elastomeric properties can be formed without the necessity of a post formation treatment such as, for example, leaching to remove the additives from the finished product.

The polyolefin which is utilized in blending the extrudable composition must be one which, when blended with the A-B-A' block copolymer and subjected to an appropriate combination of elevated pressure and elevated temperature conditions, as defined herein, is extrudable, in blended form, with the A-B-A' block copolymer. In particular, preferred polyolefin materials include polyethylene, polypropylene and polybutene, including ethylene copolymers, propylene copolymers and butene copolymers. Blends of two or more of the polyolefins may be utilized. A particularly preferred polyethylene may be obtained from U.S.I. Chemical Company under the trade designation Petrothene Na601. (Also referred to herein as PE Na601.) A particularly preferred polypropylene may be obtained from The Himont Corporation under the trade designation PC-973.

Information obtained from U.S.I. Chemical Company states that the Na601 is a low molecular weight, low density polyethylene for application in the areas of hot melt adhesives and coatings. U.S.I. has also stated that the Na601 has the following nominal values; (1) a Brookfield Viscosity, cP at 150 degrees Centigrade of 8500 and at 190 degrees Centigrade of 3300 when measured in accordance with ASTM D 3236; (2) a density of 0.903 grams per cubic centimeter when measured in accordance with ASTM D 1505; (3) an equivalent Melt index of 2000 grams per ten minutes when measured in accordance with ASTM D 1238; (4) a ring and ball softening point of 102 degrees Centigrade when measured in accordance with ASTM E 28; (5) a tensile of 850 pounds per square inch when measured in accordance with ASTM D 638; (6) an elongation of 90 percent when measured in accordance with ASTM D 638; (7) a modulus of Rigidity, $T_F$ (45,000) of $-34$ degrees Centigrade and (8) a penetration Hardness, (tenths of mm) at 77 degrees Fahrenheit of 3.6.

The Na601 is believed to have a number average molecular weight (Mn) of about 4,600; a weight average molecular weight (Mw) of about 22,400 and a Z average molecular weight (Mz) of about 83,300. The polydispersity (Mw/Mn) of the Na601 is about 4.87.

Mn is calculated by the formula $$Mn = (\text{Sum}[(n)(MW)]/\text{Sum}(n))$$

Mw is calculated by the formula:

$$Mw = (\text{Sum}[(n)(MW)^2]/\text{Sum}[(n)(MW)])$$

Mz is calculated by the formula:

$$Mz = (\text{Sum}[(n)(MW)^3]/\text{Sum}[(n)(MW)^2])$$

where:
  MW = The various molecular weights of the individual molecules in a sample, and
  n = The number of molecules in the given sample which have a given molecular weight of MW.

Typical characteristics of the Himont PC-973 polypropylene as stated by Himont are a density of about 0.900 grams per cubic centimeter measured in accordance with ASTM D 792. A meltflow rate obtained in accordance with ASTM D 1238, Condition L, of about 35 grams per ten (10) minutes. Other characteristics of the PC-973 are a tensile of about 4,300 pounds per square inch (psi) measured in accordance with ASTM D 638; a flex modulus of about 182,000 psi measured in accordance with ASTM D 790,B and a Rockwell hardness, R scale, of about 93 measured in accordance with ASTM D 785A. The PC-973 is believed to have a number average molecular weight (Mn) of about 40,100; a weight average molecular weight (Mw) of about 172,000 and a Z average weight (Mz) of about 674,000. The polydispersity of the PC-973 (Mw/Mn) is about 4.29.

The blend usually includes from at least about 20 percent, by weight, to about 95 percent, by weight, of the block copolymer and from at least about 5 percent, by weight, to about 80 percent, by weight, of the polyolefin. For example, the blend may include from at least about 30 percent, by weight, to about 90 percent, by weight, of the block copolymer and from at least about 10 percent, by weight, to about 70 percent, by weight, of the polyolefin. Preferably, the blend includes from at least about 50 percent, by weight, to about 90 percent, by weight, of the block copolymer and from at least about 10 percent, by weight, to about 50 percent, by weight, of the polyolefin. For example, the blend may include from about 50 percent, by weight, to about 70 percent, by weight, of the block copolymer and from about 30 percent, by weight, to about 50 percent, by weight, of the polyolefin. One preferred blend includes about 60 percent, by weight, of the block copolymer and about 40 percent, by weight, of the polyolefin.

The preferred elevated temperatures of extrusion and the presence of the specified polyolefin in the blend reduces the viscosity of the blend, as compared to the viscosity of the pure, i.e. neat, A-B-A' block copolymer, and thus forms an extrudable composition which can be utilized in the meltblowing of fibers and microfibers. However, both the block copolymer resins and the polyolefins must be able to sustain the extrusion temperatures utilized by the method of the present invention without undergoing excessive chain scission or excessive thermal or oxidative degradation. In this regard it is believed that the degree of oxidative degradation sustained by the extrudable composition may be reduced by using an inert gas as the attenuating gas stream in the meltblowing step. It is also believed that the degree of oxidative degredation can be reduced by blanketing the raw pellets of the resins utilized with an inert gas prior to their processing by an extruder. The fact that the amount of oxidative degradation which the block copolymer undergoes during extrusion may be reduced by using an inert gas as the attenuating gas stream is generally implied by thermogravimetric analyses of KRATON GX 1657 block copolymer resin which were carried out in air and nitrogen. In these analyses samples of the KRATON GX 1657 block copolymer resin, when heated in air, showed a weight loss beginning at about 307 degrees Centigrade whereas a comparison sample heated in nitrogen showed only a weight loss starting at about 375 degrees Centigrade. It is believed that these results indicate that the effects of oxidative degradation on the sample heated in air could be avoided or diminished by use of an inert or, at least, a non-oxidizing attenuating gas stream to thus limit degradation of the extrudable composition during attenuation at high attenuating gas temperatures and/or by use of an inert or, at least, non-oxidizing gas to blanket the raw pellets.

Referring now to the drawings where like reference numerals represent like structure or like process steps and, in particular, to FIG. 1 which schematically illustrates apparatus for forming an elastomeric nonwoven web in accordance with the present invention, it can be seen that a blend (not shown) of (a) from at least about 10 percent, by weight, of an A-B-A' block copolymer where A and A' are both thermoplastic polymer endblocks containing a styrenic moiety such as, for example, a poly(vinyl arene) and where B is an elastomeric poly(ethylene-butylene) midblock, with (b) from greater than 0 percent, by weight, to about 90 percent, by weight, of a polyolefin which, when blended with the A-B-A' block copolymer and subjected to an effective combination of elevated temperature and elevated pressure conditions, is extrudable in blended form with the A-B-A' block copolymer, is supplied in, for example, pellet form to a hopper 10 of an extruder 12. The components of the blend may be supplied in pellet or other form. The components (i.e., pellets) may be blanketed with an inert or, at least, non-oxidative gas while in the hopper 10. This is believed to reduce the effects of oxidative degradation on the blend by both reducing the contact of the blend with normal atmosphere while in the hopper 10 and also increasing the likelihood that any gas that is drawn into and through the extruder 12 will be the inert gas as opposed to oxygen-containing normal atmosphere. The blend usually includes from at least about 20 percent, by weight, to about 95 percent, by weight, of the block copolymer and from about 5 percent, by weight, to about 80 percent, by weight, of the polyolefin. For example, the blend may include from about 30 percent, by weight, to about 90 percent, by weight, of the block copolymer and from about 10 percent, by weight, to about 70 percent, by weight, of the polyolefin. Preferably, the blend includes from about 50 percent, by weight, to about 90 percent, by weight, of the block copolymer and from about 10 percent, by weight, to about 50 percent, by weight, of the polyolefin. For example, the blend may include from about 50 percent, by weight, to about 70 percent, by weight, of the block copolymer and from about 30 percent, by weight, to about 50 percent, by weight, of the polyolefin. Several of the hereinafter discussed examples include about 60 percent, by weight, of the block copolymer and about 40 percent, by weight, of the polyolefin.

The temperature of the blend is elevated within the extruder 12 by a conventional heating arrangement (not shown) to melt the blend and pressure is applied to the blend by the pressure-applying action of a turning screw (not shown), located within the extruder, to form the blend into an extrudable composition. Preferably the blend is heated to a temperature of at least about 125 degrees Centigrade if polyethylene is utilized as the polyolefin in the blend or at least about 175 degrees Centigrade if polypropylene is utilized as the polyolefin in the blend, for example, to a temperature of from at least about 290 degrees Centigrade to about 345 degrees Centigrade, more specifically, to a temperature of from at least about 300 degrees Centigrade to about 335 degrees Centigrade. The extrudable composition is then forwarded by the pressure applying action of the turning screw to a meltblowing die 14. The elevated temperature of the extrudable composition is maintained in the meltblowing die 14 by a conventional heating arrangement (not shown). The die 14 generally extends a distance which is about equal to the width 16 of the nonwoven web 18 which is to be formed by the process. The combination of elevated temperature and elevated pressure conditions which effect extrusion of the composition will vary over wide ranges. For example, at higher elevated temperatures, lower elevated pressures will result in satisfactory extrusion rates and, at higher elevated pressures of extrusion, lower elevated temperatures will effect satisfactory extrusion rates.

Figure 2:
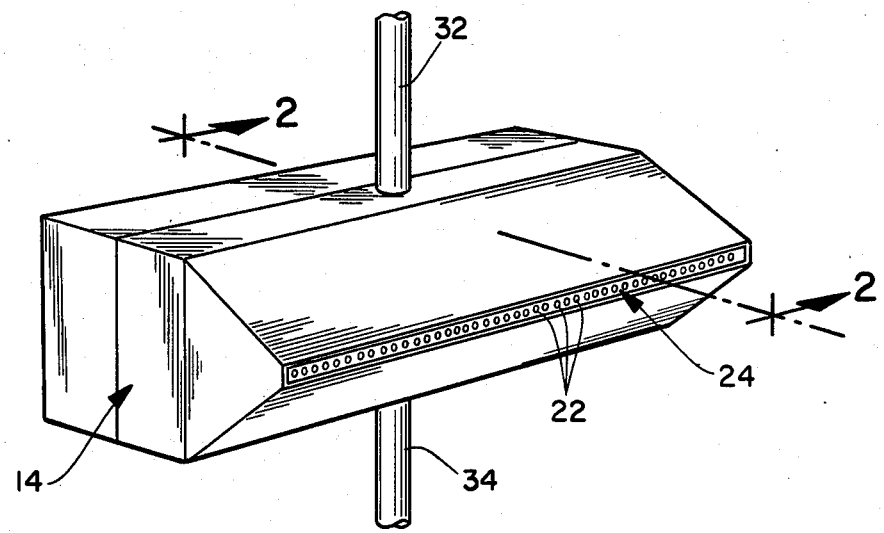
FIG. 2 is a perspective view of the meltblowing die illustrated in FIG. 1 which illustrates the linear arrangement of the capillaries of the die.
Figure 4:
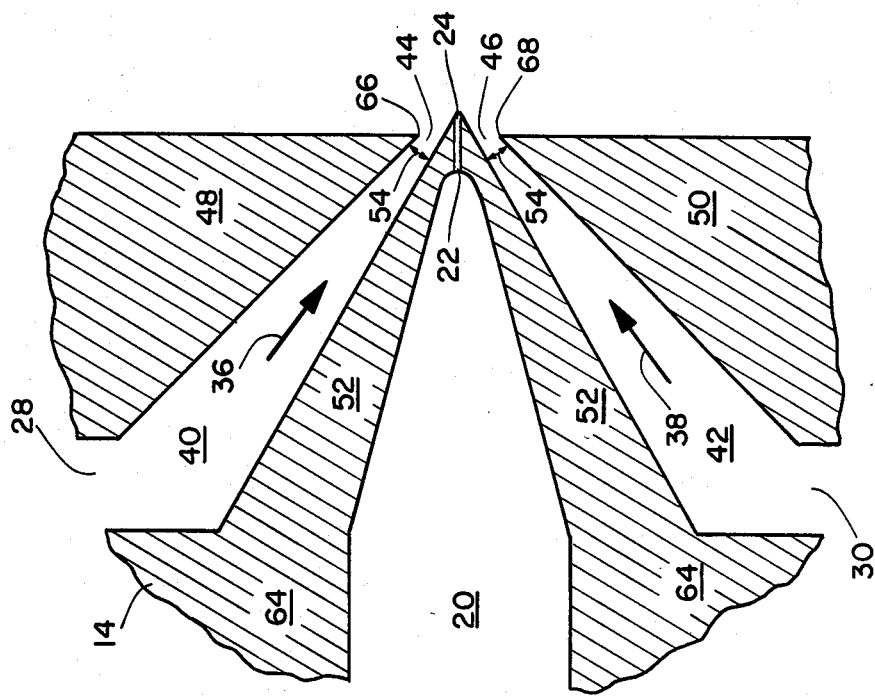
FIG. 4 is a schematic cross-sectional view of the die illustrated in FIG. 1, along line 2—2 of FIG. 2, illustrating the die in a positive die tip stick-out arrangement.
Figure 3:
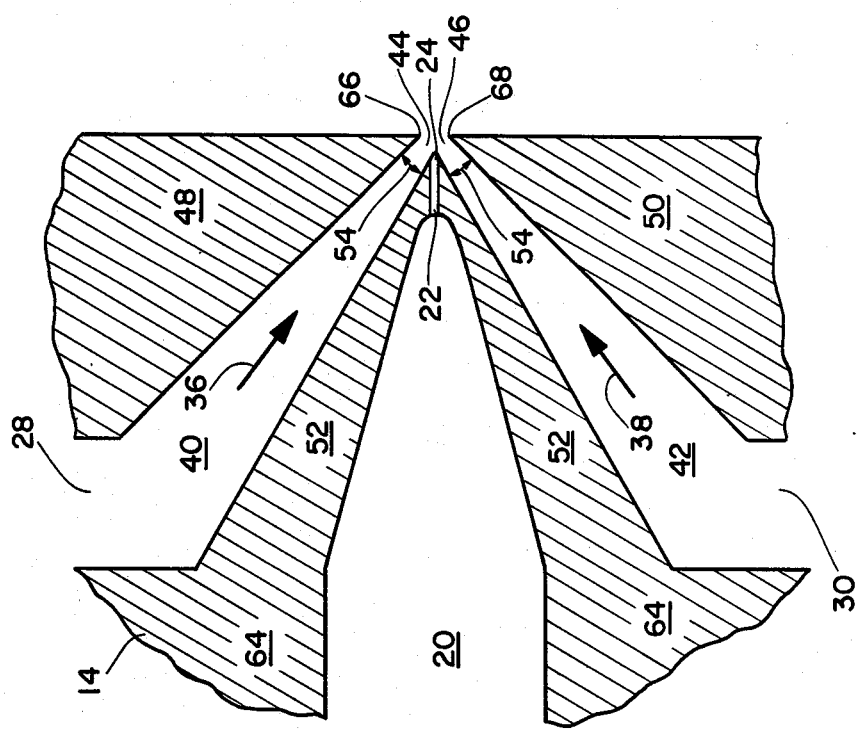
FIG. 3 is a schematic cross-sectional view of the die illustrated in FIG. 1, along line 2—2 of FIG. 2, illustrating the die in a recessed die tip arrangement.

FIGS. 3 and 4 best illustrate that the meltblowing die 14 includes an extrusion slot 20 which receives the extrudable composition from the extruder 12. The extrudable composition then passes through the extrusion slot 20 and through a plurality of small diameter capillaries 22, which exit the die 14 in a linear arrangement, best illustrated in FIG. 2, extending across the tip 24 of the die 14, to emerge from the capillaries 22 as molten threads 26. Preferably, the extrudable composition is extrudable, within the above-defined temperature ranges, through the small diameter capillaries, that is within the die tip, at pressures, as applied by the turning screw of the extruder 12, of no more than abou 300 pounds per square inch, gage, for example, from pressures of from about 20 pounds per square inch, gage to about 250 pounds per square inch, gage. More specifically, at pressures of from about 50 pounds per square inch, gage to about 250 pounds per square inch, gage for example, from about 125 pounds per square inch, gage to about 225 pounds per square inch, gage. Pressures in excess of these values may rupture or break some dies 14. Generally speaking, the extrudable composition is extruded through the capillaries 22 of the die 14 at a rate of from at least about 0.02 gram per capillary per minute to about 1.7 or more grams per capillary per minute, for example, from at least about 0.1 gram per capillary per minute to about 1.25 grams per capillary per minute. More specifically, from at least about 0.3 gram per capillary per minute to about 1.1 grams per capillary per minute.

The die 14 also includes attenuating gas inlets 28 and 30 which are provided with heated, pressurized attenuating gas (not shown) by attenuating gas sources 32 and 34. The heated, pressurized attenuating gas enters the die 14 at the inlets 28 and 30 and follows the path generally designated by the arrows 36 and 38 in FIGS. 3 and 4 through two chambers 40 and 42 and on through to narrow passageways or gaps 44 and 46 so as to contact the extruded threads 26 as they exit the capillaries 22 of the die 14. The chambers 40 and 42 are designed so that the heated attenuating gas exits the chambers 40 and 42 and passes through the gas passages 44 and 46 to form a stream (not shown) of attenuating gas which exits the die 14. The temperature and pressure of the heated stream of attenuating gas can vary widely. For example, the heated attenuating gas can be applied at a temperature of from about 100 degrees Centigrade to about 400 degrees Centigrade, more specifically from about 200 degrees Centigrade to about 350 degrees Centigrade. The heated attenuating gas can be applied at a pressure of from about 0.5 pounds per square inch, gage to about 20 pounds per square inch, gage, more specifically from about 1 pound per square inch, gage to about 10 pounds per square inch, gage.

The position of air plates 48 and 50 which, in conjunction with a die-tip portion 52 of the die 14 define the chambers 40 and 42 and the passageways 44 and 46, may be adjusted relative to the die-top portion 52 to widen or narrow the width 54 of the attenuating gas passageways 44 and 46 so that the volume of attenuating gas passing through the air passageways 44 and 46 during a given time period can be varied without varying the velocity of the attenuating gas. Furthermore, the air plates 48 and 50 can also be adjusted upwardly and downwardly to effect a "recessed" die-tip configuration or a positive die-tip "stick-out" configuration as discussed in detail below. Generally speaking, it is preferred to utilize attenuating gas pressures of less than about 20 pounds per square inch, gage in conjunction with air passageway widths, which are usually the same, of no greater than about 0.20 inches. Lower attenuating gas velocities and wider air passageway gaps are generally preferred if substantially continuous microfibers are to be produced.

The two streams of attenuating gas converge to form a stream of gas which entrains and attenuates the molten threads 26, as they exit the linearly arranged capillaries 22, into fibers or, depending upon the degree of attenuation, microfibers (also designated 26) of a small diameter, to a diameter less than the diameter of the capillaries 22. Generally speaking, the attenuating gas may be applied to the molten threads 26 at a temperature of from at least about 100 degrees Centigrade to about 400 degrees Centigrade, for example, from at least shown 200 degrees Centigrade to about 350 degrees Centigrade and at pressures of from at least about 0.5 pounds per square inch, gage to about 20 pounds per square inch, gage or more, for example, from about 1 pound per square inch, gage to about 10 pounds per square inch, gage. The gas-borne microfibers 26 are blown, by the action of the attenuating gas, onto a collecting arrangement which, in the embodiment illustrated in FIG. 1, is a foraminous endless belt 56 conventionally driven by rollers 57.

Figure 5:
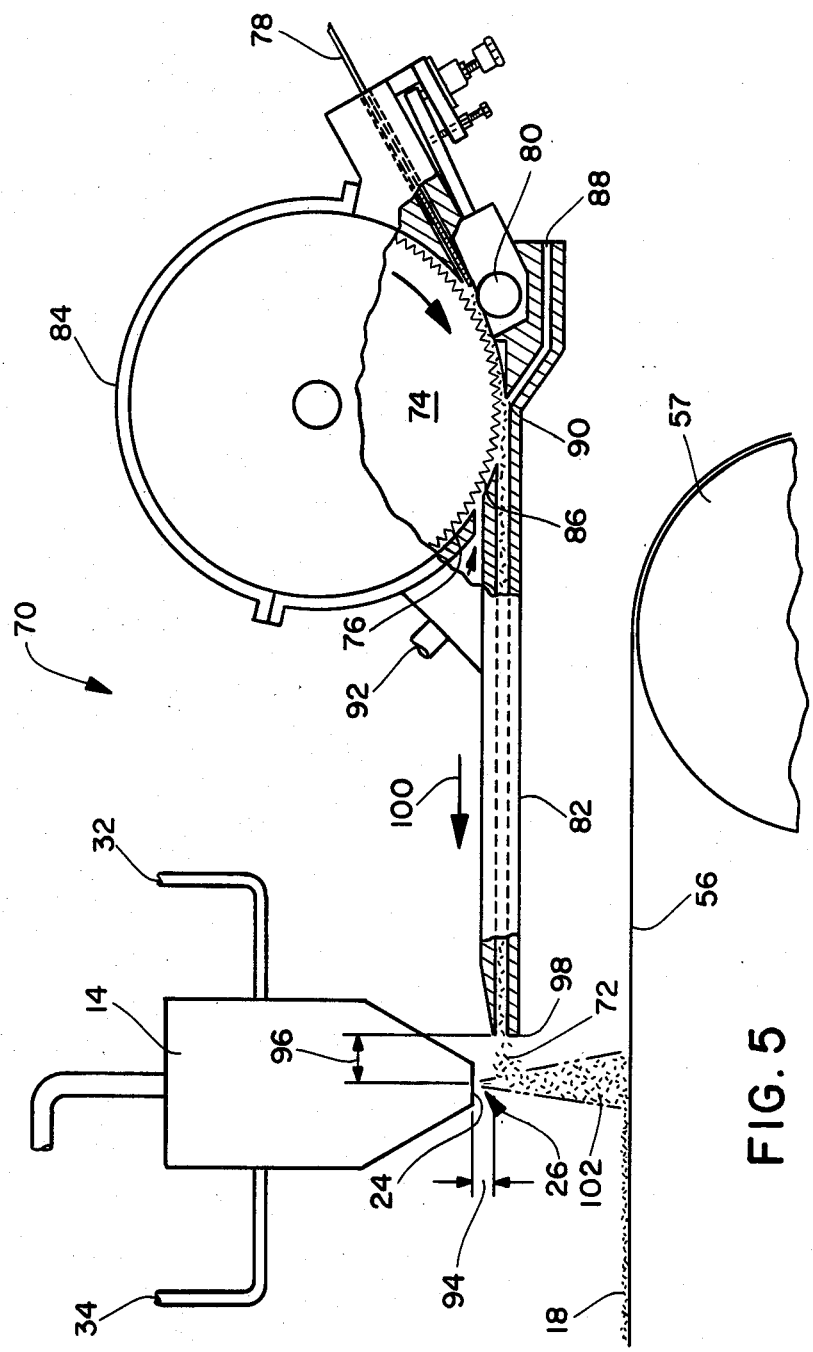
FIG. 5 is a schematic cross-sectional view with portions broken away for purposes of illustration of an arrangement which may be utilized to incorporate discrete particles, fibers or other materials into the extruded threads of molten material prior to their formation into a nonwoven web.

FIG. 1 illustrates the formation of substantially continuous microfibers 26 on the surface of the belt 56. However, the microfibers 26 can be formed in a substantially discontinuous fashion as illustrated in FIG. 5 by varying the velocity of the attenuating gas, the temperature of the attenuating gas and the volume of attenuating gas passing through the air passageways in a given time period. Other foraminous arrangements such as an endless belt arrangement may be utilized. The belt 56 may also include one or more vacuum boxes (not shown) located below the surface of the foraminous belt 56 and between the rollers 57. The microfibers 26 are collected as a fibrous nonwoven elastomeric web 18 on the surface of the drum 56 which is rotating as indicated by the arrow 58 in FIG. 1. The vacuum boxes assist in retention of the microfibers 26 on the surface of the belt 56. Typically the tip 24 of the die tip portion 52 of the meltblowing die 14 is from about 4 inches to about 24 inches from the surface of the foraminous endless belt 56 upon which the microfibers 26 are collected. The thus-collected, entangled microfibers 26 form a coherent, i.e. cohesive, fibrous nonwoven elastomeric web 18 which may be removed from the foraminous endless belt 56 by a pair of pinch rollers 60 and 62 which may be designed to press the entangled fibers of the web 18 together to improve the integrity of the web 18. Thereafter, the web 18 may be transported by a conventional arrangement to a wind-up roll (not shown) for storage. Alternatively, the web 18 may be removed directly from the belt 56 by the wind-up roller. The web 18 may be pattern-embossed as by ultrasonic embossing equipment (not shown) or other embossing equipment, such as, for example, the pressure nip formed between a heated calender and anvil roll (not shown).

Referring now to FIG. 3, it can be seen that the meltblowing die 14 includes a base portion 64 and a die tip portion 52 which generally centrally extends from the base portion 64. The centrally located die tip portion 52 is inwardly tapered to a "knife-edge" point which forms the tip 24 of the die tip portion 52 of the die 14. In order to increase the pressures of extrusion which the die 14 can withstand during operation it is preferred for the base portion 64 and die-tip portion 52 to be formed from a single block of metal which surrounds the extrusion slot 20 and the extrusion capillaries 22. The die 14 also includes two air plates 48 and 50, discussed above, which are secured, by conventional means, to the base portion 64 of the die 14. The air plate 48, in conjunction with the die tip portion 52 of the die 14, defines the chamber 40 and the attenuating gas air passage or gap 44. The air plate 50, in conjunction with the die tip portion 52, defines the chamber 42 and the air passageway or gap 46. Air plate 48 and air plate 50 terminate, respectively, in air plate lip 66 and pair plate lip 68. In the configuration illustrated in FIG. 3, the knife-edge point which forms the tip 24 of the die tip portion 52 of the die 14 is recessed inwardly of the plane formed by the air plate lips 66 and 68. In this configuration the perpendicular distance between the plane formed by the lips 66 and 68 and the tip 24 of the die tip portion 52 is sometimes referred to by those in the art as a "negative stick-out" or a "recessed" die tip configuration. If the tip of the die tip portion 52 of the die 14 were configured to protrude outwardly beyond the plane formed by the lips 66 and 68 of the air plates 48 and 50, as is illustrated in FIG. 4, such a configuration is referred to, by those in the art, as a "positive stick-out" of the tip 24 of the die tip 52. In the examples discussed below negative numbers are utilized with die tip 52 "stick-out" distances when tip 24 of the die tip 52 is recessed with regard to the plane formed by the lips 66 and 68 of the air plates 48 and 50. If the tip 24 of the die tip 52 is configured so that it protrudes beyond the plane formed by the lips 66 and 68 of the air plates 48 and 50, the die tip "stick-out" distances are given in positive numbers. Both positive and negative die tip "stick-out" values were obtained in the examples by measuring the perpendicular distance between the plane formed by the lips 66 and 68 of the air plates 48 and 50 and the knife-edge point which forms the tip 24 of the die tip portion 52 of the die 14. In other words, the closest distance between the point 24 and the plane formed by the lips 66 and 68, as defined above. It should also be noted that, unless otherwise stated, the term "air gap or width," as used herein, is the perpendicular, i.e. minimum, width 54 of either of the air passages 44 and 46. These widths are normally arranged to be identical.

In some situations it may be desirable to incorporate discreet particles of one or more solid materials into the extruded threads 26 prior to their collection as a nonwoven elastomeric web 18. For example, it may be desirable to incorporate one or more fibers such as cotton fibers, wood pulp fibers, polyester fibers or other types of fibers or particulates into the threads 26. Blends of two or more of such fibers or particulates can be incorporated. This may be accomplished by utilization of a coforming apparatus such as is illustrated schematically in FIG. 5 at 70. Several types of coforming arrangements are well-known to those in the art and one such arrangement is represented by the apparatus disclosed in U.S. Pat. No. 4,100,432 to Anderson et al. The disclosure of this patent is hereby incorporated by reference. FIG. 5 illustrates that, after formation of the microfibers 26, a stream of secondary fibers or particulates 72 is generally uniformly injected into the stream of microfibers 26. Distribution of the secondary fibers 72 generally uniformly throughout the stream of microfibers 26 is preferably accomplished by merging a secondary gas stream (not shown) containing the secondary fibers 72 with the stream of microfibers 26. Apparatus for accomplishing this merger includes a conventional picker roll 74 which has a plurality of teeth 76 that are adapted to separate a matt or batt of secondary fibers 78 into the individual secondary fibers 72. The matt or batt of secondary fibers 78 which is fed to the picker roll 74 may be a sheet of pulp fibers (if a two component mixture of elastomeric fibers and pulp fibers is desired), a matt or batt of staple fibers (if a two component mixture of elastomeric fibers and staple fibers is desired) or both a sheet of pulp fibers and a matt or batt of staple fibers (if a three component mixture of elastomeric fibers, pulp fibers and staple fibers desired). Other combinations of one or more staple fibers and/or one or more pulp fibers may be utilized. The sheets or matts of secondary fibers 72 are fed to the picker roll 74 by a roller arrangement 80. After the teeth 76 of the picker roll 74 have separated the sheet or matt 78 into separate secondary fibers 72 the individual secondary fibers 72 are conveyed toward the meltblown stream 26 of elastomeric fibers through a forming duct or nozzle 82. A housing 84 encloses the picker roll 74 and provides a passageway or gap 86 between the housing 84 and the surface of the picker roll 74. A gas (not shown), preferably air, is supplied to the passageway or gap 86 between the surface of the picker roll 74 and the housing 84 by way of a gas duct 88. The gas duct 88 preferably enters the passageway or gap 86 generally at the junction 90 of the forming duct or nozzle 82 and the passageway 86. The gas is supplied in sufficient quantity to serve as a medium for conveying the secondary fibers 72 from the teeth 76 of the picker roll 74 and through the forming duct or nozzle 82 at a velocity approaching that of the teeth 76 of the picker roll 74.

As an aid in maintaining satisfactory secondary fiber 72 velocity, the forming duct or nozzle 82 is desirably positioned so that its longitudinal axis is substantially parallel to a plane which is tangent to the surface of the picker roll 74 at the junction 90 of the forming duct or nozzle 82 with the gap 86. As a result of this arrangement the velocity of the secondary fibers 72 is not substantially changed by contact of the secondary fibers 72 with the walls of the forming duct or nozzle 82. If the secondary fibers 72 remain in contact with the teeth 76 of the picker roll 74 after they have been separated from the matt or sheet 78, the axis of the forming duct or nozzle 82 may be adjusted appropriately to be aligned in the direction of secondary fiber 72 velocity at the point where the secondary fibers 72 disengage from the teeth 76 of the picker roll 74. If desired, the disengagement of the secondary fibers 72 with the teeth 76 of the picker roll 74 may be assisted by application of a pressurized gas, i.e., air, through duct 92.

The height 94 of the forming duct or nozzle 82 with respect to the die tip 24 may be adjusted to vary the properties of the coformed product. Variation of the distance 96 of the tip 98 of the nozzle 82 from the die tip 24 will also achieve variations in the final coformed product. The height 94 and distance 96 values will also vary with the material being added to the microfibers 26. The width of the forming duct or nozzle 82 along the picker roll 74 and the length 100 that the forming duct or nozzle 82 extends from the picker roll 74 are also important in obtaining optimum distribution of the secondary fibers 72 throughout the stream of meltblown microfibers 26. Preferably, the length 100 of the forming duct or nozzle 82 should be as short as equipment design will allow. The length 100 is usually limited to a minimum length which is generally equal to the radius of the picker roll 74. Preferably, the width of the forming duct or nozzle 82 should not exceed the width of the sheets or matts 78 that are being fed to the picker roll 74.

FIG. 5 further illustrates that the gas stream carrying the secondary fibers 72 is preferably moving in a direction which is generally perpendicular to the direction of movement of the stream of the microfibers 26 at the point of merger of the two gas streams. Other angles of merger of the two streams may be utilized. The velocity of the gas stream carrying the secondary fibers 72 is usually adjusted so that it is less than the velocity of the gas stream which attenuates the microfibers 26. This allows the streams, upon merger and integration thereof, to flow in substantially the same direction as that of the stream of microfibers 26. Indeed, the merger of the two streams is preferably accomplished in a manner which is somewhat like an aspirating effect whereby the stream of a secondary fiber 72 is drawn into the stream of microfibers 26. It is also preferred that the velocity difference between the two gas streams be such that the secondary fibers 72 are integrated into the microfibers 26 in a turbulent manner so that the secondary fibers 72 become thoroughly mixed with the microfibers 26. In general, increasing the velocity differential between the two streams produces a more homogeneous integration of the secondary fibers 72 into the microfibers 26 and decreases in the velocity differential between the two streams are generally expected to produce concentrated areas of secondary fibers 72 within the microfibers 26. Generally, for increased production rates it is preferred for the gas stream which entrains and attenuates the stream of microfibers 26 to have an initial high velocity, for example from about 200 feet to about 1,000 feet per second and for the stream of gas which carries the secondary fibers 72 to have an initial low velocity, for example from about 50 to about 200 feet per second. Of course, after the stream of gas that entrains and attenuates the extruded threads 26 into elastomeric microfibers exits the air passageways 44 and 46 of the meltblowing die 14 it immediately expands and decreases in velocity.

Upon merger and integration of the stream of secondary fibers 72 into the stream of microfibers 26 to generally uniformly distribute the secondary fibers 72 throughout the stream of meltblown fibers 26, as discussed above, a composite stream 102 of microfibers 26 and secondary fibers 72 is formed. The microfibers 26 may still be semi-molten and tacky at the time of incorporation of the secondary fibers 72 into the microfibers 26, and, in such a situation, the secondary fibers 72 are not only mechanically entangled within the microfibers 26 but also usually become thermally bonded to the microfibers 26. However, if the microfibers 26 are not semi-molten and tacky at the time of incorporation of the secondary fibers 72 therein, the secondary fibers 72 will only be mechanically entangled within the microfibers 26.

In order to convert the composite stream 102 of microfibers 26 and secondary fibers 72 into a fibrous nonwoven elastomeric web 18 of elastomeric microfibers 26 having the secondary fibers 72 generally uniformly distributed throughout and, if desired, bonded to the microfibers 26 of the web 18, a collecting device is located in the path of the composite stream 102. The collecting device may be a rotating belt 56 as described with respect to FIG. 1 upon which the composite stream 102 impacts to form the web 18. Preferably, the external surface of the rotating belt 56 is porous and the rotating belt 56 includes a conventional vacuum arrangement (not shown) which assists in retaining the composite stream 102 on the external surface of the belt 56. Other collecting devices are well-known to those of skill in the art and may be utilized in place of the rotating belt 56, for example, a porous rotating drum arrangement could be utilized. Thereafter, the web 18 may be removed from the belt 56 by a pair of nip rollers (now shown) in an arrangement equivalent to that illustrated in FIG. 1. Thereafter, the web 18 may be transported by a conventional arrangement to a wind-up roller (not shown) for storage. Alternatively, the web 18 may be removed directly from the belt 56 by the wind-up roller.

Depending on the characteristics desired of the coformed fibrous nonwoven elastomeric web the web can include (1) from at least about 20 percent, by weight, of a fibrous nonwoven elastic web of microfibers as defined herein, for example microfibers comprising from (a) at least about 10 percent, by weight, of an A-B-A' block copolymer where "A" and "A'" are each a thermoplastic endblock which includes a styrenic moiety and where "B" is an elastomeric poly(ethylene-butylene) midblock with (b) from greater than 0 percent, by weight, up to about 90 percent, by weight, of a polyolefin which, when blended with the A-B-A' block copolymer and subjected to an effective combination of elevated temperature and elevated pressure conditions, can be extruded in blended form, with the A-B-A' block copolymer and (2) from greater than 0 percent, by weight, to about 80 percent, by weight, of at least one secondary fiber generally uniformly distributed throughout the fibrous nonwoven elastomeric web. The fibrous nonwoven elastomeric web can be formed from a block copolymer/polyolefin blend within any of the above-mentioned blend ranges. Additionally, the secondary fibers can form from about 30 percent, by weight, to about 70 percent, by weight, of the coformed web, even more specifically the secondary fibers can form from about 50 percent, by weight, to about 70 percent, by weight, of the coformed web.

The picker roll 74 may be replaced by a conventional particulate injection system to make a fibrous nonwoven elastomeric web 18 containing various particulates. A combination of both coformed fibers and particulates could be added to the microfibers 26 prior to their formation into a fibrous nonwoven elastomeric web 18.

Throughout the various examples discussed herein, a variety of meltblowing die extruders and configurations were utilized in a variety of combinations to illustrate the broad applicability of the present invention. Specific details of the meltblowing dies and extruders are, for ease of reference, tabulated in Tables II and III below:

TABLE II
MELTBLOWING DIES

| Die No. | Extent of Capillary Array (inches) | Capillaries per inch of die extent | Capillary diameter (inches) | Capillary length (inches) |
|---|---|---|---|---|
| #1 | 20 | 15 | 0.018 | 0.14 |
| #2 | 20 | 30 | 0.0145 | 0.113 |
| #3 | 1⅝ | 20 | 0.0145 | 0.113 |
| #4 | 1⅝ | 9 | 0.0145 | 0.113 |

TABLE III
EXTRUDERS

| Extruder Designation | Type | Diameter (inches) | Temperature Zones | Length/Diameter Ratio |
|---|---|---|---|---|
| A | Johnson | 1.5 | 3 | 24:1 |
| B | Brabender | 0.75 | 3 | 24:1 |

Meltblowing dies 3 and 4 are high pressure dies. Reference will be made to certain combinations of meltblowing dies and extruders with, for example, a designation of "A2" meaning that extruder "A" was utilized in conjunction with meltblowing die "2".

EXAMPLE I

A fibrous nonwoven elastic web was formed by utilizing the techniques illustrated in FIG. 5 to combine cotton fibers with meltblown microfibers formed from a blend of 60 percent, by weight, of a A-B-A' block copolymer having polystyrene "A" and "A'" end blocks and a poly (ethylene-butylene) "B" midblock (obtained from the Shell Chemical Company under the trade designation KRATON GX 1657) and 40 percent, by weight, of a polyethylene (obtained from U.S.I. Chemical Company under the trade designation PE Na601).

Meltblowing of the fibrous nonwoven elastic web was accomplished by extruding the blend of materials from a one and one-half inch Johnson extruder and through a meltblowing die having 15 extrusion capillaries per lineal inch of die tip. That is, meltblowing system A1, as defined herein, was utilized. The capillaries each had a diameter of about 0.018 inches and a length of about 0.14 inches. The blend was extruded through the capillaries at a rate of about 1.36 grams per capillary per minute at a temperature of about 314.4 degrees Centigrade. The extrusion pressure exerted upon the blend in the die tip was measured as 200 pounds per square inch, gage, giving a viscosity for the blend of about 153 poise in the die capillaries. The die tip configuration was adjusted so that it was recessed about 0.090 (−0.090 die tip stick-out) inches from the plane of the external surface of the lips of the air plates which form the attenuating air passageways on either side of the row of capillaries. The air plates were adjusted so that the two attenuating air passages, one on each side of the extrusion capillaries, formed passageways having air gaps, i.e. widths, of about 0.067 inches. It should be noted that the air passageway or gap configuration utilized in this Example 1 differed slightly from the configuration illustrated in FIG. 3 in that the angle formed by the die tip portion 52, that is the angle which the capillaries 22 bisect, is 90 degrees and, therefore, the air gaps 44 and 46 are wider near the tip 24 of the die tip 52 than at the areas 40 and 42. In other words, the air gaps 44 and 46, of this die configuration, widen as opposed to narrowing as the attenuating air progresses as indicated by the arrows 36 and 38. Forming air for meltblowing the blend was supplied to the air passageways at a temperature of about 341.1 degrees Centigrade and at a pressure of about 4 pounds per square inch, gage. The meltblown fibers thus formed were blown toward a forming screen which was approximately 11 inches from the die tip.

Utilizing the conventional coforming techniques as illustrated in FIG. 5, bleached cotton fibers obtained from Cotton Incorporated of N.Y. State and having a length of about one and one-half inches were incorporated into the stream of meltblown microfibers prior to their deposition upon the forming screen. The cotton fibers were first formed, by a Rando Webber mat forming apparatus, into a mat having an approximate basis weight of about 75 grams per square meter. The mat was fed to the picker roll by a picker roll feed roll which was positioned about 0.005 inches from the surface of the picker roll. The picker roll was rotating at a rate of about 3,000 revolutions per minute and fiber transporting air was supplied to the picker roll at a pressure of about 4 pounds per square inch, gage. Actual measurement of the position of the nozzle of the coform apparatus with respect to the stream of meltblown microfibers was not made. However, it is believed that the nozzle of the coforming apparatus was positioned about 2 inches below the die tip of the meltblowing die and about 2 inches back from the die tip of the meltblowing die. This procedure provided a fibrous nonwoven elastomeric web having a width (cross-machine direction) of about twenty (20) inches which was composed of a blend of about 70 percent, by weight, of the elastomeric meltblown microfibers and about 30 percent, by weight, of the cotton fibers.

A three inch wide by five inch long sample of the fibrous nonwoven web formed by the procedure of Example I was tested for elongation in both the machine direction and the cross-machine direction. The machine direction tests were conducted on a sample which was cut from the 20 inch wide web and measured three inches in the cross-machine direction and five inches in the machine direction. The cross-machine direction tests were conducted on a sample which was cut from the 20 inch wide web and measured three inches in the machine direction and five inches in the cross machine direction. Each sample was placed lengthwise in an Instron Model 1122 testing apparatus having an initial jaw setting of about three (3) inches and which stretched the samples at a rate of about ten (10) inches per minute to a length which was 150 percent, that is one and one-half times, the length of the unstretched sample, i.e. 50 percent elongation. The load, in grams, necessary to achieve the 150 percent length was measured and the sample was maintained at the 150 percent length (50 percent elongation) for one (1) minute. At the end of the one minute period, the load, in grams, necessary to maintain the length of the sample at the 150 length (50 percent elongation) was measured and the length of the sample was increased from 150 percent to 200 percent of the original unstretched length of the sample, that is twice the original length of the unstretched sample, i.e. 100 percent elongation. The load, in grams, necessary to achieve the 200 percent length was measured and the sample was then maintained at the 200 percent length for a one minute. At the end of the second one minute period the load, in grams, necessary to maintain the length of the sample at 200 percent (100 percent elongation) was measured. Thereafter, all load was removed from the sample and the percent of permanent deformation of the sample was measured. (For hypothetical illustration only, if a three inch sample returned to 3.3 inches the percent of permanent deformation would be 10 percent, i.e., 0.3/3.0.) After measurement of the percent of permanent deformation, the sample was elongated to break (i.e., rupture) and the peak load, in grams, encountered during elongation of the sample to break and the percent of elongation of the sample at break was measured. The percent of elongation at break is reported as a percent of the unstretched length of the sample. For example, if a sample having an unstretched length of 3 inches broke at 9 inches its elongation at break value would be 200 percent.

The results are indicated in the following Table IV, below, where it can be seen that the load reduction after the one (1) minute waiting period decreased in each case and that the peak load was about that of the initial load at 100 percent elongation. These results demonstrate the elastomeric properties of the samples since to obtain a meaningful understanding of the elastomeric properties of material it is valuable to know both the percent of stretch to which the sample was subjected and the amount of permanent set which the material retained.

TABLE IV

|  | Machine Direction | Cross-Machine Direction |
|---|---|---|
| Initial Load at the 150% length (50% elongation) | 411 grams | 209 grams |
| Load at 150% length after 1 minute (50% elongation) | 214 grams | 113 grams |
| Initial Load at the 200% length (100% elongation) | 420 grams | 258 grams |
| Load at the 200% length after 1 minute (100% elongation) | 240 grams | 143 grams |
| % Permanent Deformation | 16% | 21% |
| Peak Load Encountered | 393 grams | 266 grams |
| % Elongation at Break | 171% | 225% |

EXAMPLE II

A fibrous nonwoven elastic web was formed by meltblowing a blend of 90 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 10 percent, by weight, of a polyethylene (obtained from U.S.I. Chemical Company under the trade designation PE Na601).

Meltblowing of the fibrous nonwoven elastic web was accomplished by extruding the blend of materials through a 0.75 inch diameter Brabender extruder and through a meltblowing die having nine extrusion capillaries per lineal inch of die tip. That is, extruder/die arrangement B4 as defined herein, was utilized. The capillaries each had a diameter of about 0.0145 inches and a length of about 0.113 inches. The blend was extruded through the capillaries at a rate of about 0.36 grams per capillary per minute at a temperature of about 322.8 degrees Centigrade. The extrusion pressure exerted upon the blend in the die tip was measured as 450 pounds per square inch, gage. The die tip configuration was adjusted so that it extended about 0.010 inches (0.010 inch die tip stick-out) beyond the plane of the external surface of the lips of the air plates which form the forming air passageways on either side of the capillaries. The air plates were adjusted so that the two forming air passageways, one on each side of the extrusion capillaries, formed air passageways of a width or gap of about 0.060 inches. Forming air for meltblowing the blend was supplied to the air passageways at a temperature of about 335.6 degrees Centigrade and at a pressure of about 1.5 pounds per square inch, gage. The viscosity of the blend was calculated at 651 poise in the capillaries. The meltblown fibers thus formed were blown onto a forming screen which, while not actually measured, is believed to have been approximately 12 inches from the die tip.

EXAMPLE III

A fibrous nonwoven elastic web was formed by meltblowing a blend of 80 percent, by weight, of an A-B-A' block copolymer having polystyrene "A" and "A'"

endblocks and a poly(ethylene-butylene) "B" midblock (obtained from the Shell Chemical Company under the trade designation KRATON GX 1657) and 20 percent, by weight, of a polyethylene (obtained from U.S.I. Chemical Company under the trade designation PE Na601).

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4 as defined herein, was utilized. The capillaries each had a diameter of about 0.0145 inches and a length of about 0.113 inches. The blend was extruded through the capillaries at a rate of about 0.43 grams per capillary per minute at a temperature of about 322.8 degrees Centigrade. The extrusion pressure exerted upon the blend in the die tip was measured as 472 pounds per square inch, gage. The die tip configuration was adjusted so that it extended about 0.010 inches (0.010 inch die tip stick-out) beyond the plane of the external surface of the lips of the air plates which form the air passages on either side of the capillaries. The air plates were adjusted so that the two air passages, one on each side of the extrusion capillaries, formed air passageways of a width or gap of about 0.060 inches. Forming air for meltblowing the blend was supplied to the air passageways at a temperature of about 325.0 degrees Centigrade and at a pressure of about 2.0 pounds per square inch, gage. The viscosity of the blend was calculated at 572 poise in the capillaries. The meltblown fibers thus formed were blown onto a forming screen which, while not actually measured, is believed to have been appproximately 12 inches from the die tip.

EXAMPLE IV

A fibrous nonwoven elastic web was formed by meltblowing a blend of 70 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 30 percent, by weight, of a polyethylene (obtained from U.S.I. Chemical Company under the trade designation PE Na601).

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.43 grams per capillary per minute at a temperature of about 322.8 degrees Centigrade. The extrusion pressure exerted upon the blend in the die tip was measured as 375 pounds per square inch, gage. The die tip configuration was adjusted so that it extended about 0.010 inches (0.010 inch die tip stick-out) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 325.0 degrees Centigrade and at a pressure of about 2.0 pounds per square inch, gage. The viscosity of the blend was calculated at 454 poise in the capillaries. The meltblown fibers thus formed were blown onto a forming screen which, while not actually measured, is believed to have been approximately 12 inches from the die tip.

EXAMPLE V

A fibrous nonwoven elastic web was formed by meltblowing a blend of 70 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 30 percent, by weight, of a polyethylene (obtained from U.S.I. Chemical Company under the trade designation PE Na601).

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.64 grams per capillary per minute at a temperature of about 322.2 degrees Centigrade. The extrusion pressure exerted upon the blend in the die tip was measured as 480 pounds per square inch, gage. The die tip configuration was adjusted it extended about 0.010 inches (0.010 inch die tips tick-out) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 324.4 degrees Centigrade and at a pressure of about 4.5 pounds per square inch, gage. The viscosity of the blend was calculated at 391 poise in the capillaries. The meltblown fibers thus formed were blown onto a forming screen which, while not actually measured, is believed to have been approximately 12 inches from the die tip.

EXAMPLE VI

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 40 percent, by weight, of a polyethylene (obtained from U.S.I. Chemical Company under the trade designation PE Na601).

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.36 grams per capillary per minute at a temperature of about 323.9 degrees Centigrade. The extrusion pressure exerted upon the blend in the die tip was measured as 240 pounds per square inch, gage. The die tip configuration was adjusted so that it extended about 0.010 inches (0.010 inch die tip stickout) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 334.4 degrees Centigrade and at a pressure of about 1.5 pounds per square inch, gage. The viscosity of the blend was calculated at 347 poise in the capillaries. The meltblown fibers thus formed were blown onto a forming screen which, while not actually measured, is believed to have been approximately 12 inches from the die tip.

EXAMPLE VII

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON G 1652) and 40 percent, by weight, of a polyethylene (obtained from U.S.I. Chemical Company under the trade designation PE Na601).

Meltblowing of the fibrous nonwoven elastic web was accomplished by extruding the blend of materials through a 0.75 Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.36 grams per capillary per minute at a temperature of about 323.9 degrees Centigrade. The extrusion pressure exerted upon the blend in the die tip was measured as 220 pounds per square inch, gage. The die tip configuration was adjusted so that it extended about 0.010 inches (0.010 inch die tip stickout) beyond the plane of the external surface of the tips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 335.0 degrees Centigrade and at a pressure of about 1.5 pounds per square inch, gage. The viscosity of the blend was calculated at 318 poise in the capillaries. The meltblown fibers thus formed were blown onto a forming screen which, while not actually measured, is believed to have been approximately 12 inches from the die tip.

EXAMPLE VIII

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 40 percent, by weight, of a polypropylene (obtained from The Himont Company under the trade designation PC-973).

Meltblowing of the fibrous nonwoven elastic web was accomplished by extruding the blend of materials through a 0.75 inch Brabender extruder through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.32 grams per capillary per minute at a temperature of about 324.4 degrees Centigrade. The extrusion pressure exerted upon the blend in the die tip was measured as 380 pounds per square inch, gage. The die tip configuration was adjusted so that it extended about 0.010 inches (0.010 inch die tip stickout) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 337.8 degrees Centigrade and at a pressure of about 2.0 pounds per square inch, gage. The viscosity of the blend was calculated at 619 poise in the capillaries. The meltblown fibers thus formed were blown onto a forming screen which, while not actually measured, is believed to have been approximately 12 inches from the die tip.

COMPARATIVE EXAMPLE IX

A fibrous nonwoven elastic web was formed by meltblowing a composition of 100 percent, by weight, of an A-B-A' block copolymer having polystyrene "A" and "A'" endblocks and a poly(ethylene-butylene) "B" midblock (obtained from the Shell Chemical Company under the trade designation KRATON GX 1657).

Meltblowing of the fibrous nonwoven elastic web was accomplished by extruding the composition through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The composition was extruded through the capillaries at a rate of about 0.32 grams per capillary per minute at a temperature of about 324.4 degrees Centigrade. The extrusion pressure exerted upon the composition in the die tip was measured as greater than 505 (off scale of the pressure probe) pounds per square inch, gage. The die tip configuration was adjusted so that it extended about 0.010 inches (0.010 inch die tip stick-out) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the composition was supplied to the air passageways at a temperature of about 337.8 degrees Centigrade and at a pressure of about 2.0 pounds per square inch, gage. The viscosity of the composition was calculated as greater than 823 (off scale) poise in the capillaries because the pressure probe was off scale. The meltblown fibers thus formed were blown onto a forming screen which, while not actually measured, is believed to have been approximately 12 inches from the die tip.

Table V summarizes the variables utilized in examples 2 through 9.

TABLE V

| Example | 2 | 3 | 4 | 5 | 6 | 7 | 8 | 9 |
|---|---|---|---|---|---|---|---|---|
| Extruder/Die Arrangement[1] | B4 | B4 | B4 | B4 | B4 | B4 | B4 | B4 |
| Material[2] | 90A/10B | 80A/20B | 70A/30B | 70A/30B | 60A/40B | 60C/40B | 60A/40D | 100A |
| Extrusion Rate[3] | 0.36 | 0.43 | 0.43 | 0.64 | 0.36 | 0.36 | 0.32 | 0.32 |
| Extrusion Temperature[4] | 322.8 | 322.8 | 322.8 | 322.2 | 323.9 | 323.9 | 324.4 | 324.4 |
| Extrusion Pressure[5] | 450 | 472 | 375 | 480 | 240 | 220 | 380 | 505+ |
| Die Tip Stick-Out[6] | 0.010 | 0.010 | 0.010 | 0.010 | 0.010 | 0.010 | 0.010 | 0.010 |
| Air Passageway Gap[7] | 0.060 | 0.060 | 0.060 | 0.060 | 0.060 | 0.060 | 0.060 | 0.060 |
| Air Temperature[8] | 335.6 | 325.0 | 325.0 | 324.4 | 334.4 | 335.0 | 337.8 | 337.8 |
| Air Pressure[9] | 1.5 | 2.0 | 2.0 | 4.5 | 1.5 | 1.5 | 2.0 | 2.0 |
| Material Viscosity[10] | 651 | 572 | 454 | 391 | 347 | 318 | 619 | 823+ |
| Distance[11] Die-Tip to Forming Screen | 12 | 12 | 12 | 12 | 12 | 12 | 12 | 12 |

The following footnotes apply to Table V:
[1]as defined herein
[2]A = KRATON GX 1657 (Shell)
B = Polyethylene PE Na601 (U.S.I.)
C = KRATON G 1652 (Shell)
D = Polypropylene PC-973 (Himont)
90A/10B = 90 percent, by weight, A blended with 10 percent, by weight, of B
[3]in grams per capillary per minute
[4]in degrees Centigrade
[5]in pounds per square inch, gage in the capillaries
[6]negative values indicate recessed die tip arrangement, in inches
[7]in inches
[8]in degrees Centigrade
[9]in pounds per square inch, gage
[10]in poise
[11]in inches, not actually measured The elastomeric characteristics of the fibrous nonwoven webs formed in examples 2, 3, and 6 through 9 were measured. Data was also obtained for one of the 70 percent KRATON GX 1657/30 percent polyethylene blends (examples 4 or 5) but it is not absolutely certain with which example the data is to be associated. It is believed that the data is to be associated with Example 4 and it is so reported. If this assumption were incorrect, the data should be associated with Example 5. The testing was accomplished by utilization of an Instron tensile tester model 1122, which elongated each sample, at a rate level of five (5) inches per minute, 100 percent, that is 200 percent of the original unstretched machine direction length and then allowed the sample to return to an unstretched condition. This procedure was repeated four (4) times and then each sample was elongated to break or tear. Each sample was two (2) inches wide (transverse machine direction) by five (5) inches long (machine direction) and the initial jaw separation on the tester was set at one (1) inch. The samples were placed lengthwise in the tester. The data which was obtained is tabulated in Table VI below.

TABLE VI

| Example | Stretch Number | MD Strip Tensile[1] | Energy[2] | Percent Permanent Set[3] |
|---|---|---|---|---|
| 2 | 1 | 366 | 0.498 | 3.3 |
| 2 | 2 | 355 | 0.437 | 3.7 |
| 2 | 3 | 353 | 0.430 | 4.1 |
| 2 | 4 | 351 | 0.423 | 4.7 |
| 2 | 5 | 348 | 0.416 | 4.9 |
| 2 | [4]to break (758%) | 1,760 | 12.9 | N/A |
| 3 | 1 | 400 | 0.537 | 3.9[5] |
| 3 | 2 | 388 | 0.461 | 5.5 |
| 3 | 3 | 381 | 0.442 | 6.1 |
| 3 | 4 | 378 | 0.431 | 6.2 |
| 3 | 5 | 375 | 0.420 | 6.7 |
| 3 | [4]to break (833%) | 1,590 | 14.7 | N/A |
| 4 | 1 | 515 | 0.746 | 2.8 |
| 4 | 2 | 510 | 0.655 | 3.9 |
| 4 | 3 | 505 | 0.633 | 4.1 |
| 4 | 4 | 498 | 0.622 | 4.5 |
| 4 | 5 | 495 | 0.615 | 4.5 |
| 4 | [4]to break (746%) | 2,058 | 18.7 | N/A |
| 6 | 1 | 670 | 0.984 | 4.3 |
| 6 | 2 | 656 | 0.797 | 5.1 |
| 6 | 3 | 649 | 0.763 | 5.5 |
| 6 | 4 | 638 | 0.742 | 6.1 |
| 6 | 5 | 635 | 0.729 | 6.1 |

TABLE VI-continued

| Example | Stretch Number | MD Strip Tensile[1] | Energy[2] | Percent Permanent Set[3] |
|---|---|---|---|---|
| 6 | [4]to break (698%) | 1,916 | 16.8 | N/A |
| 7 | 1 | 565 | 0.795 | 2.8 |
| 7 | 2 | 550 | 0.652 | 3.9 |
| 7 | 3 | 542 | 0.623 | 4.1 |
| 7 | 4 | 534 | 0.605 | 4.1 |
| 7 | 5 | 530 | 0.594 | 4.3 |
| 7 | [4]to break (670%) | 1,996 | 15.3 | N/A |
| 8 | 1 | 1,907 | 3.20 | 11.5 |
| 8 | 2 | 1,865 | 1.63 | 14.5 |
| 8 | 3 | 1,824 | 1.47 | 15.0 |
| 8 | 4 | 1,812 | 1.41 | 17.0 |
| 8 | 5 | 1,792 | 1.40 | 17.0 |
| 8 | [4]to break (699%) | 4,929 | 41.0 | N/A |
| 9 | 1 | 513 | 0.682 | 3.7 |
| 9 | 2 | 506 | 0.585 | 4.1 |
| 9 | 3 | 504 | 0.569 | 5.9 |
| 9 | 4 | 497 | 0.559 | 4.5 |
| 9 | 5 | 496 | 0.554 | 5.9 |
| 9 | [4]to break (661%) | 4,365 | 23.8 | N/A |

Footnotes for Table VI

[1]in grams per two inch wide sample and reported as an average of two replicate measurements with the average then being normalized to a 100 gram per square meter material according to the formula reported value =

(average value) $\times \left( \dfrac{100}{\text{actual basis weight}} \right)$.

[2]in inch-pounds and reported as an average of two replicate measurements with the average then being normalized to a 100 gram per square meter material according to the formula of the immediately preceding footnote 1.

[3]as a percent of the unstretched length of the sample and reported as an average of two replicate measurements unless otherwise noted.

[4]as a percentage increase of the length of the original unstretched sample and reported as an average of two replicate measurements. For example, 100 percent would equal twice the length of the original unstretched sample.

[5]one measurement only.

EXAMPLE X

A fibrous nonwoven elastic web was formed by meltblowing a blend of 70 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 30 percent, by weight, of a polyethylene (obtained from U.S.I. Chemical Company under the trade designation PE Na601).

Meltblowing of the fibrous nonwoven elastic web was accomplished by extruding the blend of materials through a 1.5 inch diameter Johnson extruder and through a meltblowing die having thirty extrusion capillaries per lineal inch of die tip. That is, extruder/die arrangement A2, as defined herein, was utilized. The capillaries each had a diameter of about 0.0145 inches and a length of about 0.113 inches. The blend was extruded through the capillaries at a rate of about 0.302 grams per capillary per minute at a temperature of about 299.0 degrees Centigrade. The extrusion pressure exerted upon the blend in the die tip was measured as 155 pounds per square inch, gage. The die tip configuration was adjusted so that it was recessed about 0.080 inches (−0.080 die tip stick-out) from the plane of the external surface of the lips of the air plates which form the air passageways on either side of the capillaries. The air plates were adjusted so that the two air passageways, one on each side of the extrusion capillaries, formed air passageways of a width or gap of about 0.067 inches. Forming air for meltblowing the blend was supplied to the air passageways at a temperature of about 316.7 degrees Centigrade and at a pressure of about 7.0 pounds per square inch, gage. The viscosity of the blend was calculated at 267 poise in the capillaries. The meltblown fibers thus formed were blown onto a forming screen which was approximately 8 inches from the die tip.

EXAMPLE XI

A fibrous nonwoven elastic web was formed by meltblowing a blend of 70 percent, by weight of an A-B-A' block copolymer having polystyrene "A" and "A'" endblocks and a poly(ethylene-butylene) "B" midblock (obtained from the Shell Chemical Company under the trade designation KRATON GX 1657) and 30 percent, by weight, of a polyethylene (obtained from U.S.I. Chemical Company under the trade designation PE Na601).

Meltblowing of the fibrous nonwoven elastic web was accomplished by extruding the blend of materials through a 1.5 inch diameter Johnson extruder and through a meltblowing die having thirty extrusion capillaries per lineal inch of die tip. That is, extruder/die arrangement A2, as defined herein, was utilized. The capillaries each had a diameter of about 0.0145 inches and a length of about 0.113 inches. The blend was extruded through the capillaries at a rate of about 0.302 grams per capillary per minute at a temperature of about 299.0 degrees Centigrade. The extrusion pressure exerted upon the blend in the die tip was measured as 156 pounds per square inch, gage. The die tip configuration was adjusted so that it was recessed about 0.080 (−0.080 die tip stick-out) inches from the plane of the external surface of the lips of the air plates which form the air passageways on either side of the capillaries. The air plates were adjusted so that the two air passageways, one on each side of the extrusion capillaries, formed air passageways of a width or gap of about 0.067 inches. Forming air for meltblowing the blend was supplied to the air passageways at a temperature of about 316.7 degrees Centigrade and at a pressure of about 3.5 pounds per square inch, gage. The viscosity of the blend was calculated as 269 poise in the capillaries. The meltblown fibers thus formed were blown onto a forming screen which was approximately 8 inches from the die tip.

EXAMPLE XII

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 40 percent, by weight, of a polyethylene (obtained from U.S.I. Chemical Company under the trade designation PE Na601).

Meltblowing of the fibrous nonwoven elastic web was accomplished by extruding the blend of materials through a 1.5 inch diameter Johnson extruder and through a meltblowing die having thirty extrusion capillaries per lineal inch of die tip. That is, extruder/die arrangement A2, as defined herein, was utilized. The capillaries each had a diameter of about 0.0145 inches and a length of about 0.113 inches. The blend was extruded through the capillaries at a rate of about 0.302 grams per capillary per minute at a temperature of about 295.0 degrees Centigrade. The extrusion pressure exerted upon the blend in the die tip was measured as 93 pounds per square inch, gage. The die tip configuration was adjusted so that it was recessed about 0.080 (−0.080 die tip stick-out) inches from the plane of the external surface of the lips of the air plates which form the air passageways on either side of the capillaries. The air plates were adjusted so that the two air passageways, one on each side of the extrusion capillaries, formed air passageways of a width or gap of about 0.067 inches. Forming air for meltblowing the blend was supplied to the air passageways at a temperature of about 311.7 degrees Centigrade and at a pressure of about 3.5 pounds per square inch, gage. The viscosity of the blend was calculated at 160 poise in the capillaries. The meltblown fibers thus formed were blown onto a forming screen which was approximately 8 inches from the die tip.

EXAMPLE XIII

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 40 percent, by weight, of a polyethylene (obtained from U.S.I. Chemical Company under the trade designation PE Na601).

Meltblowing of the fibrous nonwoven elastic web was accomplished by extruding the blend of materials through a 1.5 inch diameter Johnson extruder and through a meltblowing die having thirty extrusion capillaries per lineal inch of die tip. That is, extruder/die arrangement A2, as defined herein, was utilized. The capillaries each had a diameter of about 0.0145 inches and a length of about 0.113 inches. The blend was extruded through the capillaries at a rate of about 0.302 grams per capillary per minute at a temperature of about 299.4 degrees Centigrade. The extrusion pressure exerted upon the blend in the die tip was measured as 86 pounds per square inch, gage. The die tip configuration was adjusted so that it was recessed about 0.080 (−0.080 die tip stick-out) inches from the plane of the external surface of the lips of the air plates which form the air passageways on either side of the capillaries. The air plates were adjusted so that the two air passageways, one on each side of the extrusion capillaries, formed air passageways of a width or gap of about 0.067 inches. Forming air for meltblowing the blend was supplied to the air passageways at a temperature of about 316.1 degrees Centigrade and at a pressure of about 7.0 pounds per square inch, gage. The viscosity of the blend was calculated as 148 poise in the capillaries. The meltblown fibers thus formed were blown onto a forming screen which was approximately 8 inches from the die tip.

EXAMPLE XIV

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 40 percent, by weight, of a polyethylene (obtained from U.S.I. Chemical Company under the trade designation PE Na601).

Meltblowing of the fibrous nonwoven elastic web was accomplished by extruding the blend of materials through a 1.5 inch diameter Johnson extruder and through a meltblowing die having thirty extrusion capillaries per lineal inch of die tip. That is, extruder/die arrangement A2, as defined herein, was utilized. The capillaries each had a diameter of about 0.0145 inches and a length of about 0.113 inches. The blend was extruded through the capillaries at a rate of about 0.504 grams per capillary per minute at a temperature of about 293.3 degrees Centigrade. The extrusion pressure exerted upon the blend in the die tip was measured as 170 pounds per square inch, gage. The die tip configuration was adjusted so that it was recessed about 0.080 (−0.080 die tip stick-out) inches from the plane of the external surface of the lips of the air plates which form the air passageways on either side of the capillaries. The air plates were adjusted so that the two air passageways, one on each side of the extrusion capillaries, formed air passageways of a width or gap of about 0.067 inches. Forming air for meltblowing the blend was supplied to the air passageways at a temperature of about 310.0 degrees Centigrade and at a pressure of about 3.5 pounds per square inch, gage. The viscosity of the blend was calculated as 176 poise in the capillaries. The meltblown fibers thus formed were blown onto a forming screen which was approximately 12 inches from the die tip.

EXAMPLE XV

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 40 percent, by weight, of a polyethylene (obtained from U.S.I. Chemical Company under the trade designation PE Na601).

Meltblowing of the fibrous nonwoven elastic web was accomplished by extruding the blend of materials through a 1.5 inch diameter Johnson extruder and through a meltblowing die having thirty extrusion capillaries per lineal inch of die tip. That is, extruder/die arrangement A2, as defined herein, was utilized. The capillaries each had a diameter of about 0.0145 inches and a length of about 0.113 inches. The blend was extruded through the capillaries at a rate of about 0.504 grams per capillary per minute at a temperature of about 295.0 degrees Centigrade. The extrusion pressure exerted upon the blend in the die tip was measured as 160 pounds per square inch, gage. The die tip configuration was adjusted so that it was recessed about 0.080 (−0.080 die tip stick-out) inches from the plane of the external surface of the lips of the air plates which form the air passageways on either side of the capillaries. The air plates were adjusted so that the two air passageways, one on each side of the extrusion capillaries, formed air passageways of a width or gap of about 0.067 inches. Forming air for meltblowing the blend was supplied to the air passageways at a temperature of about 308.9 degrees Centigrade and at a pressure of about 10.0 pounds per square inch, gage. The viscosity of the blend was calculated as 165 poise in the capillaries. The meltblown fibers thus formed were blown onto a forming screen which was approximately 12 inches from the die tip.

EXAMPLE XVI

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 40 percent, by weight, of a polyethylene (obtained from U.S.I. Chemical Company under the trade designation PE Na601).

Meltblowing of the fibrous nonwoven elastic web was accomplished by extruding the blend of materials through a 1.5 inch diameter Johnson extruder and through a meltblowing die having thirty extrusion capillaries per lineal inch of die tip. That is, extruder/die tip arrangement A2, as defined herein, was utilized. The capillaries each had a diameter of about 0.0145 inches and a length of about 0.113 inches. The blend was extruded through the capillaries at a rate of about 0.504 grams per capillary per minute at a temperature of about 294.4 degrees Centigrade. The extrusion pressure exerted upon the blend in the die tip was measured as 153 pounds per square inch, gage. The die tip configuration was adjusted so that it was recessed about 0.080 (−0.080 die tip stick-out) inches from the plane of the external surface of the lips of the air plates which form the air passageways on either side of the capillaries. The air plates were adjusted so that the two air passageways, one on each side of the extrusion capillaries, formed air passageways of a width or gap of about 0.067 inches. Forming air for meltblowing the blend was supplied to the air passageways at a temperature of about 307.2 degrees Centigrade and at a pressure of about 7.0 pounds per square inch, gage. The viscosity of the blend was calculated as 158 poise in the capillaries. The meltblown fibers thus formed were blown onto a forming screen which was approximately 12 inches from the die tip.

Table VII summarizes the variables utilized in examples 10 through 16.

TABLE VII

| Example | 10 | 11 | 12 | 13 | 14 | 15 | 16 |
|---|---|---|---|---|---|---|---|
| Extruder/Die Arrangement[1] | A2 | A2 | A2 | A2 | A2 | A2 | A2 |
| Material[2] | 70A/30B | 70A/30B | 60A/40B | 60A/40B | 60A/40B | 60A/40B | 60A/40B |
| Extrusion Rate[3] | 0.302 | 0.302 | 0.302 | 0.302 | 0.504 | 0.504 | 0.504 |
| Extrusion Temperature[4] | 299.0 | 299.0 | 295.0 | 299.4 | 293.3 | 295.0 | 294.4 |
| Extrusion Pressure[5] | 155 | 156 | 93 | 86 | 170 | 160 | 153 |
| Die Tip Stick-Out[6] | −0.080 | −0.080 | −0.080 | −0.080 | −0.080 | −0.808 | −0.080 |
| Air Passageway Gap[7] | 0.067 | 0.067 | 0.067 | 0.067 | 0.067 | 0.067 | 0.067 |
| Air Temperature[8] | 316.7 | 316.7 | 311.7 | 316.1 | 310.0 | 308.9 | 307.2 |
| Air Pressure[9] | 7.0 | 3.5 | 3.5 | 7.0 | 3.5 | 10.0 | 7.0 |
| Material Viscosity[10] | 267 | 269 | 160 | 148 | 176 | 165 | 158 |
| Distance[11] Die-Tip to Forming Screen | 8 | 8 | 8 | 8 | 12 | 12 | 12 |

The following footnotes apply to Table VII:
[1] as defined herein
[2] A = KRATON GX 1657 (Shell)
B = Polyethylene PE Na601 (U.S.I.)
90A/10B = 90 percent, by weight, A blended with 10 percent, by weight, of B
[3] in grams per capillary per minute
[4] in degrees Centigrade
[5] in pounds per square inch, gage in the capillaries
[6] negative values indicate recessed die tip arrangement, in inches
[7] in inches
[8] in degrees Centigrade
[9] in pounds per square inch, gage
[10] in poise
[11] in inches Comparison of examples 4 through 6 of Table V with examples 10 through 16 of Table VII reveals that different extrusion pressures and thus different polymer viscosities resulted from examples which were otherwise generally comparable. These viscosity differences may have resulted from the fact that one lot, lot A, of KRATON GX 1657 block copolymer was utilized in examples 2–6, 8 and 9, and a different lot, lot B, of KRATON GX 1657 block copolymer was utilized in examples 10 through 16. In view of these results, the meltflow rate (MFR) of lot A and lot B of the KRATON GX 1657 block copolymer was tested in accordance with ASTM standard D-1238 at 320 degrees Centigrade and using a 2,160 gram load since, generally speaking, higher melt-flow rates are associated with lower polymer viscosities. The results of these tests are reported below in Table VIII.

TABLE VIII

|  | Lot A | Lot B |
|---|---|---|
| MFR[1] | 98 | 148 |

The machine direction elongation characteristics of the fibrous nonwoven elastomeric webs formed by the processes detailed in examples 10 through 16 were tested by obtaining a two (2) inch wide (transverse direction) by five (5) inch long (machine direction) sample of each material. Each sample was placed lengthwise in an Instron model 1122 tester with an initial jaw separation setting of one (1) inch. The sample was then stretched at a rate of ten (10) inches per minute in the machine direction, i.e. lengthwise, to determine the load, in grams, required to elongate each sample 100 percent in the machine direction (L100). That is, the load, in grams, required to elongate each sample to a machine direction length of twice its unstretched machine direction length. Thereafter, each sample was elongated to break in the machine direction and the percent elongation of the sample in the machine direction at break (EB) was measured as a percentage of the unstretched machine direction length of the sample. The peak load (PL), in grams, encountered during elongation of the sample to break was also measured. The L100 and PL results which are reported in Table IX, below, were normalized to a fibrous nonwoven web having a basis weight of 100 grams per square meter by utilizing the following equation:

Normalized Value=Actual Value×(100)/(Actual Basis Weight)

TABLE IX

| Example | 10 | 11 | 12 | 13 | 14 | 15 | 16 |
|---|---|---|---|---|---|---|---|
| L100[1] | 485 | 495 | 584 | 609 | 505 | 609 | 571 |
| EB[2] | 579 | 645 | 509 | 422 | 524 | 355 | 391 |
| PL[3] | 1,453 | 1,304 | 1,227 | 1,176 | 898 | 1,031 | 1,042 |

Footnotes to Table VI
[1] = in grams, for a two inch wide sample, normalized to 100 gram per square meter sample
[2] = in percent of unstretched machine direction length
[3] = in grams, for a two inch wide sample, normalized to 100 gram per square meter sample Review of Table V generally reveals that the viscosity of the extrudable composition decreases as the polyolefin content of the composition increases. To further emphasize this fact the viscosity data from Table V are reproduced in Table X, below.

TABLE X

| % Tri-block Copolymer | % Polyethylene | Viscosity |
|---|---|---|
| 100 | 0 | 823+ poise |
| 90 | 10 | 651 poise |
| 80 | 20 | 572 poise |

TABLE X-continued

| % Tri-block Copolymer | % Polyethylene | Viscosity |
|---|---|---|
| 70 | 30 | 452 poise |
| 60 | 40 | 347 poise |

The results of Table X and the other above-mentioned data clearly demonstrate that the viscosity of the extrudable composition decreases rapidly with increasing polyolefin content. Further and surprisingly, the data demonstrate that the elastometric properties of the nonwoven webs formed from the extrudable composition generally approximates the elasticity of the nonwoven webs formed solely from the block copolymer. In fact, the elasticity of the nonwoven materials formed from the extrudable composition remains quite satisfactory even at high polyolefin contents.

EXAMPLE XVII

A fibrous nonwoven elastic web was formed by meltblowing a blend of 50 percent, by weight, of an A-B-A' block copolymer having polystyrene "A" and "A'" endblocks and a poly(ethylene-butylene) "B" midblock (obtained from the Shell Chemical Company under the trade designation KRATON G 1652) and 50 percent, by weight, of a polybutene (obtained from Amoco under the trade designation Indopol L-14).

Amoco literature states that the Amoco polybutenes are a series of isobutylene-butene copolymers composed predominantly of high molecular weight mono-olefin (95 percent–100 percent) with the balance being isoparaffins. Typical properties of the L-14 polybutene as stated by Amoco literature are reported in Table XI, below.

TABLE XI

| INDOPOL - L - 14 | | |
|---|---|---|
|  | Test Method | L-14 |
| Viscosity | D445 | |
| cSt at 38° C. (100° F.) | | 27–33 |
| cSt at 99° C. (210° F.) | | — |
| Flash Point COC °C.(°F.), Min | D92 | 138 (280) |
| API Gravity at 16° C. (60° F.) | D287 | 36–39 |
| Color | APHA | |
| Haze Free, Max. | | 70 |
| Haze, Max. | | 15 |
| Appearance | Visual | No Foreign Material |
| Viscosity, SUS at 38° C. (100° F.) | | 139 |
| SUS at 99° C. (210° F.) | | 42 |
| Average Molecular Weight | Vapor Phase Osmometer | 320 |
| Viscosity Index | ASTM D567 | 69 |
| Fire Point COC, ° C. (°F.) | ASTM D92 | 154 (310) |
| Pour Point, °C. (°F.) | ASTM D97 | −51 (−60) |
| Specific Gravity 15.6/15.6 °C. (60/60° F.) | | 0.8373 |
| Density, Lb/Gal | | 6.97 |
| Ref. Index, N20D | ASTM D1218 | 1.4680 |
| Acidity, mg KOH/g | ASTM D974 | 0.03 |
| Total sulfur, ppm | X-Ray | 6 |

Meltblowing of the fibrous nonwoven elastic web was accomplished by extruding the blend of materials through a 0.75 inch diameter Brabender extruder through a meltblowing die having twenty extrusion capillaries per lineal inch of die tip. That is, extruder/die arrangement B3, as defined herein, was utilized. The capillaries each had a diameter of about 0.0145 inches and a length of about 0.113 inches. The blend was extruded through the capillaries at a rate of about 0.53 grams per capillary per minute at a temperature of about 204 degrees Centigrade. The extrusion pressure exerted upon the blend in the die tip was measured as less than 40 pounds per square inch, gage. The die tip configuration was adjusted so that it extended about 0.010 inches beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 204 degrees Centigrade and at a very low, unmeasured, pressure of about 1 pound per square inch, gage. The viscosity of the blend was calculated at about 39 poise in the capillaries.

A considerable amount of smoke was produced during Example XVII and it is believed that this was due to the vaporization of the L-14 material since the temperature of extrusion was higher than the flash point of the material as specified in Table XI. Due to the excessive smoking no material was collected in accordance with the procedures of Example XVII.

Accordingly, the extrusion temperature was reduced to 160 degrees Centigrade and Example XVIII was conducted.

EXAMPLE XVIII

A fibrous nonwoven elastic web was formed by meltblowing a blend of 50 percent, by weight, of an A-B-A' block copolymer having polystyrene "A" and "A'" endblocks and a poly(ethylene-butylene) "B" midblock (obtained from the Shell Chemical Company under the trade designation KRATON G 1652) and 50 percent, by weight, of a polybutene (obtained from Amoco under the trade designation Indopol L-14).

Meltblowing of the fibrous nonwoven elastic web was accomplished by extruding the blend of materials through a 0.75 inch diameter Brabender extruder and through a meltblowing die having twenty extrusion capillaries per lineal inch of die tip. That is, extruder/die arrangement B3, as defined herein, was utilized. The capillaries each had a diameter of about 0.0145 inches and a length of about 0.113 inches. The blend was extruded through the capillaries at a rate of about 0.53 grams per capillary per minute at a temperature of about 160 degrees Centigrade. The extrusion pressure exerted upon the blend in the die tip was not measured. The die tip configuration was adjusted so that it extended about 0.010 inches beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 160 degrees Centigrade and at a very low, unmeasured, pressure of about 1 pound per square inch, gage. The viscosity of the blend could not be calculated because extrusion pressure was not measured. The meltblown fibers thus formed were blown onto a forming screen which while not actually measured is believed to have been approximately 12 inches from the die tip.

Reduction of the temperature of extrusion from 204 degrees Centigrade to 160 degrees Centigrade reduced the amount of smoke and a fibrous nonwoven elastomeric web was successfully produced.

A two (2) inch wide transverse direction by five (5) inch long machine direction sample was placed lengthwise in an Instron Model 1122 tester having an initial jaw separation of one (1) inch and elongated to break at a rate of five (5) inches per minute. The peak load encountered in elongating the sample to break was measured as 328 grams. The energy at break was measured at 2.01 inch-pounds and the elongation at break, as a percent of the unstretched length of the sample, was measured as 406 percent. The reported peak load and energy at break results were normalized to a 100 gram per square meter value by utilizing the formula identified in footnote one of Table VI.

A different two (2) inch wide, transverse direction, by five (5) inch long, machine direction, sample of the material obtained in accordance with Example XVIII was then stretched to 75 percent of the elongation at break percent of the prior sample. The sample was placed lengthwise in an Instron Model 1122 tester having an initial jaw separation of one (1) inch and elongated at a rate of five (5) inches per minute. That is, the sample was stretched to 75 percent of 406 percent elongation or about 305 percent. Then the sample was relaxed to an unstretched condition and the procedure was repeated three (3) times. Thereafter, the sample was elongated to break. The results of this test are reported in Table XII, below.

TABLE XII

| Stretch No. | Load[1] | Energy[2] | % Stretch[3] |
| --- | --- | --- | --- |
| 1 | 295 | 1.24 | 305% |
| 2 | 259 | 0.92 | 305% |
| 3 | 236 | 0.82 | 305% |
| 4 | 219 | 0.75 | 305% |
| to break | 253 | 1.29 | 420% |

Footnotes to Table XII
[1] = in grams, normalized to a 100 gram per square meter sample
[2] = in inch-pounds, normalized to a 100 gram per square meter sample
[3] = as a percent of the unstretched sample. For example, 100 percent means twice the unstretched length of the sample.

Table XII indicates that the fibrous nonwoven elastomeric web of Example XVIII demonstrated satisfactory elongation characteristics but had generally lower tensile strength than comparable materials not containing the Indopol L-14 polybutene.

As a short cut in determining an indication of the ranges over which commercially feasible throughput (extrusion rates) amounts of the KRATON G 1652/L-14 blends could be meltblown, blends of various amounts of the KRATON G 1652 and the L-14 materials were formulated and the meltflow characteristics of each of the blends was determined. The meltflow value of a given blend is important because, generally speaking, meltflow values, as determined by ASTM test procedure D-1238, condition E (190 degrees Centigrade and 2,160 gram load), in excess of 50 grams per capillary per ten (10) minutes tend to indicate that the blend can be meltblown on a commercial scale. The results of these meltflow tests are detailed in Table XIII below.

TABLE XIII

| Kraton G 1652[1] | Indopol[2] L-14 | Meltflow |
| --- | --- | --- |
| 60 | 40 | 6.75[3] |
| 55 | 45 | 15.6[3] |
| 50 | 50 | 227[3] |
| 50 | 50 | 132[4] |
| 50 | 50 | 11.7[5] |
| 45 | 55 | 507[3] |

Footnotes for Table XIII.
[1] = percent, by weight.
[2] = percent, by weight.
[3] = ASTM D-1238, Condition E (190° C.; 2,160 gram load).
[4] = same as preceding footnote[3] except temperature maintained at 170° C.
[5] = same as preceding footnote[4] except temperature maintained at 150° C.

The results of Table XIII tend to indicate that the KRATON G 1652/Indopol L-14 blends may be meltblown at commercially feasible throughput rates at temperatures of about 170° C. when the blend contains 50 percent, by weight, of the Indopol L-14.

EXAMPLE XIX

A fibrous nonwoven elastic web was formed by meltblowing a blend of 70 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 30 percent, by weight, of a polyethylene (obtained from U.S.I. Chemical Company under the trade designation PE Na601).

Meltblowing of the fibrous nonwoven elastic web was accomplished by extruding the blend of materials through a 0.75 Brabender extruder and through a meltblowing die having twenty extrusion capillaries per lineal inch of die tip. That is, extruder/die arrangement B3, as defined herein, was utilized. The capillaries each had a diameter of about 0.0145 inches and a length of about 0.113 inches. The blend was extruded through the capillaries at a rate of about 0.16 grams per capillary per minute at a temperature of about 602 degrees Fahrenheit. The extrusion pressure exerted upon the blend in the die tip was measured as 208 pounds per square inch gage. The die tip configuration was adjusted so that it extended about 0.010 inches beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 601 degrees Fahrenheit and at a pressure of about 2 pounds per square inch gage. The viscosity of the blend was calculated as 677 poise in the capillaries. The meltblown fibers thus formed were blown onto a forming screen which, while not actually measured, is believed to have been approximately 12 inches from the die tip.

EXAMPLE XX

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 40 percent, by weight, of a polyethylene (obtained from U.S.I. Chemical Company under the trade designation PE Na601).

Meltblowing of the fibrous nonwoven elastic web was accomplished by extruding the blend of materials through a 0.75 inch diameter Brabender extruder and through a meltblowing die having twenty extrusion capillaries per lineal inch of die tip. That is, extruder/die arrangement B3, as defined herein, was utilized. The capillaries each had a diameter of about 0.0145 inches and a length of about 0.113 inches. The blend was extruded through the capillaries at a rate of about 0.31 grams per capillary per minute at a temperature of about 602 degrees Fahrenheit. The extrusion pressure exerted upon the blend in the die tip was measured as 200 pounds per square inch gage. The die tip configuration was adjusted so that it extended about 0.010 inches beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 600 degrees Fahrenheit and at a pressure of about 2 pounds per square inch gage. The viscosity of the blend was calculated as 336 poise in the capillaries. The meltblown fibers thus formed were blown onto a forming screen which, while not actually measured, is believed to have been approximately 12 inches from the die tip.

EXAMPLE XXI

A fibrous nonwoven elastic web was formed by meltblowing a blend of 50 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 50 percent, by weight, of a polyethylene (obtained from U.S.I. Chemical Company under the trade designation PE Na601).

Meltblowing of the fibrous nonwoven elastic web was accomplished by extruding the blend of materials through a 0.75 inch diameter Brabender extruder and through a meltblowing die having twenty extrusion capillaries per lineal inch of die tip. That is, extruder/die arrangement B3, as defined herein, was utilized. The capillaries each had a diameter of about 0.0145 inches and a length of about 0.113 inches. The blend was extruded through the capillaries at a rate of about 0.56 grams per capillary per minute at a temperature of about 603 degrees Fahrenheit. The extrusion pressure exerted upon the blend in the die tip was measured as 201 pounds per square inch gage. The die tip configuration was adjusted so that it extended about 0.010 inches beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 600 degrees Fahrenheit and at a pressure of about 2 pounds per square inch gage. The viscosity of the blend was calculated as 187 poise in the die tip. The meltblown fibers thus formed were blown onto a forming screen which, while not actually measured, is believed to have been approximately 12 inches from the die tip.

EXAMPLE XXII

A fibrous nonwoven elastic web was formed by meltblowing a blend of 40 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 60 percent, by weight, of a polyethylene (obtained from U.S.I. Chemical Company under the trade designation PE Na601).

Meltblowing of the fibrous nonwoven elastic web was accomplished by extruding the blend of materials through a 0.75 inch diameter Brabender extruder and through a meltblowing die having twenty extrusion capillaries per lineal inch of die tip. That is, extruder/die arrangement B3, as defined herein, was utilized. The capillaries each had a diameter of about 0.0145 inches and a length of about 0.113 inches. The blend was extruded through the capillaries at a rate of about 0.82 grams per capillary per minute at a temperature of about 602 degrees Fahrenheit. The extrusion pressure exerted upon the blend in the die tip was measured as 198 pounds per square inch gage. The die tip configuration was adjusted so that it extended about 0.010 inches beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 600 degrees Fahrenheit and at a pressure of about 2 pounds per square inch gage. The viscosity of the blend was calculated as 126 poise in the capillaries. The meltblown fibers thus formed were blown onto a forming screen which, while not actually measured, is believed to have been approximately 12 inches from the die tip.

EXAMPLE XXIII

A fibrous nonwoven elastic web was formed by meltblowing a blend of 30 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 70 percent, by weight, of a polyethylene (obtained from U.S.I. Chemical Company under the trade designation PE Na601).

Meltblowing of the fibrous nonwoven elastic web was accomplished by extruding the blend of materials through a 0.75 inch diameter Brabender extruder and through a meltblowing die having twenty extrusion capillaries per lineal inch of die tip. That is, extruder/die arrangement B3, as defined herein, was utilized. The capillaries each had a diameter of about 0.0145 inches and a length of about 0.113 inches. The blend was extruded through the capillaries at a rate of about 0.94 grams per capillary per minute at a temperature of about 594 degrees Fahrenheit. The extrusion pressure exerted upon the blend in the die tip was measured as 166 pounds per square inch gage. The die tip configuration was adjusted so that it extended about 0.010 inches beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 600 degrees Fahrenheit and at a pressure of about 2 pounds per square inch. The viscosity of the blend was calculated as 92 poise in the die tip. The meltblown fibers thus formed were blown onto a forming screen which, while not actually measured, is believed to have been approximately 12 inches from the die tip.

Table XIV summarizes the variables utilized in examples 19 through 23.

TABLE XIV

| Example | 19 | 20 | 21 | 22 | 23 |
|---|---|---|---|---|---|
| Extruder/Die Arrangement[1] | B3 | B3 | B3 | B3 | B3 |
| Material[2] | 70A/30B | 60A/40B | 50A/50B | 40A/60B | 30A/70B |
| Extrusion Rate[3] | 0.16 | 0.31 | 0.56 | 0.82 | 0.94 |
| Extrusion Temperature[4] | 602 | 602 | 603 | 602 | 594 |
| Extrusion Pressure[5] | 208 | 200 | 201 | 198 | 166 |
| Die Tip Stick-Out[6] | 0.010 | 0.010 | 0.010 | 0.010 | 0.010 |
| Air Passageway Gap[7] | 0.060 | 0.060 | 0.060 | 0.060 | 0.060 |
| Air Temperature[8] | 601 | 600 | 600 | 600 | 600 |
| Air Pressure[9] | 2 | 2 | 2 | 2 | 2 |
| Material Viscosity[10] | 677 | 336 | 187 | 126 | 92 |
| Distance[11] Die-Tip to Forming | 12 | 12 | 12 | 12 | 12 |

TABLE XIV-continued

| Example | 19 | 20 | 21 | 22 | 23 |
|---------|----|----|----|----|----|
| Screen  |    |    |    |    |    |

Footnotes for Table XIV:
[1] as defined herein
[2] A = KRATON GX 1657 (Shell)
B = Polyethylene PE Na601 (U.S.I.)
90A/10B = 90 percent, by weight, A blended with 10 percent, by weight, of B
[3] in grams per capillary per minute
[4] in degrees Fahrenheit
[5] in pounds per square inch, gage in the capillaries
[6] negative values indicate recessed die tip arrangement, in inches
[7] in inches
[8] in degrees Fahrenheit
[9] in pounds per square inch, gage
[10] in poise
[11] in inches, not actually measured In examples 19 through 23, which all utilized extruder/die configuration B3, as defined herein, the temperature of extrusion, extrusion pressure, air temperature, and air pressure were maintained as constant as practical. Accordingly, referring to Table XV the dramatic decrease in the viscosity of blend in the capillaries and the accompanying increase in extrusion (throughput) rates as the percent, by weight, of the polyolefin material is increased is clear.

To further investigate the effects of increasing polyolefin content in the blends on the fibrous nonwoven elastomeric webs formed therefrom the elongation, peak load and energy at break characteristics of samples of the fibrous nonwoven webs formed in examples 19 through 23, were measured by obtaining five (5) samples of each web having a cross machine direction width of two (2) inches and a machine direction length of five (5) inches. Each of the five samples was placed lengthwise in an Instron tensile tester model TM with an initial jaw separation of one (1) inch. Each sample was then stretched at a rate of 5 inches per minute to determine the load, in grams, required to elongate the sample to break. These results are reported below in Table XV, below.

TABLE XV

| Example | Sample | Basis weight[1] | Tensile[2] | Energy[3] | Percent[4] Elongation |
|---------|--------|-----------------|------------|-----------|------------------------|
| 19 | 1 | 116 | 1,470 | 4,940 | 663 |
| 19 | 2 | 166 | 1,460 | 6,605 | 525 |
| 19 | 3 | 158 | 1,430 | 6,670 | 675 |
| 19 | 4 | 147 | 1,410 | 6,510 | 688 |
| 19 | 5 | — | — | — | — |
| 19 Avg[5] | — | 146.86 | 1,343 | 6,181 | 638 |
| 19 SD[6] | — | 18.6 | 158 | 719 | 66 |
| 19 N[7] | — | 85.00 | 777 | 3,578 | — |
| 20 | 1 | 63.5 | 650 | 2,965 | 550 |
| 20 | 2 | 63.5 | 560 | 2,260 | 525 |
| 20 | 3 | 63.5 | 590 | 2,390 | 538 |
| 20 | 4 | 66.6 | 660 | 2,635 | 488 |
| 20 | 5 | 58.9 | 540 | 2,080 | 500 |
| 20 Avg[5] | — | 63.24 | 600 | 2,466 | 520 |
| 20 SD[6] | — | 3.1 | 48 | 308 | 23 |
| 20 N[7] | — | 85.00 | 806 | 3,315 | — |
| 21 | 1 | 104 | 1,130 | 4,280 | 500 |
| 21 | 2 | 102 | 1,050 | 3,120 | 275 |
| 21 | 3 | 113 | 1,340 | 4,755 | 513 |
| 21 | 4 | 112 | 1,040 | 3,005 | 311 |
| 21 | 5 | 110 | 1,180 | 3,970 | 463 |
| 21 Avg[5] | — | 108.19 | 1,148 | 3,826 | 428 |
| 21 SD[6] | — | 4.6 | 109 | 673 | 88 |
| 21 N[7] | — | 85.00 | 902 | 3,006 | — |
| 22 | 1 | 155 | 1,760 | 4,885 | 350 |
| 22 | 2 | 155 | 1,770 | 5,135 | 350 |
| 22 | 3 | 143 | 1,600 | 4,955 | 375 |
| 22 | 4 | 144 | 1,610 | 4,560 | 350 |
| 22 | 5 | 146 | 1,650 | 4,500 | 358 |
| 22 Avg[5] | — | 148.49 | 1,678 | 4,807 | 355 |
| 22 SD[7] | — | 4.6 | 73 | 241 | 10 |
| 22 N[7] | — | 85.00 | 961 | 2,752 | — |
| 23 | 1 | 143 | 1,520 | 2,480 | 113 |
| 23 | 2 | 144 | 1,600 | 2,945 | 213 |
| 23 | 3 | 124 | 1,420 | 2,225 | 200 |
| 23 | 4 | 141 | 1,640 | 3,435 | 250 |
| 23 | 5 | 149 | 1,750 | 3,290 | 225 |
| 23 Avg[5] | — | 140.12 | 1,586 | 2,875 | 200 |
| 23 SD[6] | — | 7.7 | 111 | 462 | 47 |
| 23 N[7] | — | 85.00 | 962 | 1,744 | — |

Footnotes for Table XV:
[1] = in grams per square meter
[2] = in grams per two (2) inch sample
[3] = in inch-grams
[4] = as a percent of the length of the unstretched sample, that is 100 percent equals twice the length of the original sample
[5] = average
[6] = standard deviation
[7] = values normalized to 85 grams per square meter value These data generally indicate that the tensile strength of the material increases with increasing amounts of Na601 polyethylene. Further, increasing amounts of polyethylene tend to decrease the elongation at break of the material. However, even at 70 percent, by weight, Na601 polyethylene content is 200 percent elongation, at break is obtained.

Another group of samples, that is the following Examples 24 through 30, was formed using a third lot, lot C, of KRATON GX 1657 blended with various amounts of polypropylene materials.

EXAMPLE XXIV

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 40 percent, by weight, of a polypropylene (obtained from The Himont Chemical Company under the trade designation PC-973).

Meltblowing of the fibrous nonwoven elastic web ws accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.33 grams per capillary per minute at a temperature of about 322 degrees Centigrade. The extrusion pressure exerted upon the blend in the die tip was measured as 265 pounds per square inch, gage. The die tip configuration was adjusted so that it extended about 0.010 inches (0.010 inch die tip stickout) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 337 degrees Centigrade and at a pressure of about 2.0 pounds per square inch, gage. The viscosity of the blend was calculated at 419 poise in the capillaries. The meltblown fibers thus formed were blown onto a forming screen which was approximately 12 inches from the die tip.

EXAMPLE XXV

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657) and 4 percent, by weight, of a polypropylene (obtained from Eastman Chemical Products, Inc. under the trade designation Epolene N-15 wax).

Data available from Eastman states that the Epolene N-15 has a polyolefin content of approximately 100 percent, a specific gravity of about 0.86 at 25 degrees Centigrade (water=1) and a softening point of about 163 degrees Centigrade (325 degrees Fahrenheit) Ring and Ball (ASTM D-36-26). The molecular weight of the Epolene N-15 is believed to be low.

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.33 grams per capillary per minute at a temperature of about 322 degrees Centigrade. The extrusion pressure exerted upon the blend in the die tip was measured as 20 pounds per square inch, gage. The die tip configuration was adjusted so that it extended about 0.010 inches (0.010 inch die tip stickout) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 337 degrees Centigrade and at a pressure of about 2.0 pounds per square inch, gage. The viscosity of the blend was calculated at 32 poise in the capillaries. The meltblown fibers thus formed were blown onto a forming screen which was approximately 12 inches from the die tip.

EXAMPLE XXVI

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657), 20 percent, by weight, of a polypropylene (obtained from The Himont Chemical Company under the trade designation PC 973) and 20 percent, by weight, of a polypropylene (obtained from Eastman Chemical Products, Inc. under the trade designation Epolene N-15 wax).

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.33 grams per capillary per minute at a temperature of about 323 degrees Centigrade. The extrusion pressure exerted upon the blend in the die tip was measured as 101 pounds per square inch, gage. The die tip configuration was adjusted so that it extended about 0.010 inches (0.010 inch die tip stickout) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 337 degrees Centigrade and at a pressure of about 2.0 pounds per square inch, gage. The viscosity of the blend was calculated at 159 poise in the capillaries. The meltblown fibers thus formed were blown onto a forming screen which was approximately 12 inches from the die tip.

EXAMPLE XXVII

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657), 20 percent, by weight, of a polypropylene (obtained from the Himont Chemical Company under the trade designation PC 973) and 20 percent, by weight, of a polypropylene (obtained from Eastman Chemical Products, Inc. under the trade designation Epolene N-15 wax).

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.33 grams per capillary per minute at a temperature of about 230 degrees Centigrade. The extrusion pressure exerted upon the blend in the die tip was measured as 190 pounds per square inch, gage. The die tip configuration was adjusted so that it extended about 0.010 inches (0.010 inch die tip stickout) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 337 degrees Centigrade and at a pressure of about 2.0 pounds per square inch, gage. The viscosity of the blend was calculated at 300 poise in the capillaries. The meltblown fibers thus formed were blown onto a forming screen which was approximately 12 inches from the die tip.

EXAMPLE XXVIII

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657), 20 percent, by weight, of a polypropylene (obtained from The Himont Chemical Company under the trade designation PC 973) and 20 percent, by weight, of a polypropylene (obtained from Eastman Chemical Products, Inc. under the trade designation Epolene N-15 wax).

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.33 grams per capillary per minute at a temperature of about 221 degrees Centigrade. The extrusion pressure exerted upon the blend in the die tip was rapidly rising when it was measured as 300 pounds per square inch, gage. Accordingly, the example was aborted and sample material was not gathered. The die tip configuration was adjusted so that it extended about 0.010 inches (0.010 inch die tip stick-out) beyond the plane of the external surface of the lips of the air plates which form the air passageways on either side of the capillaries. The air plates were adjusted so that the two air pasageways, one on each side of the extrusion capillaries, formed air passageways of a width or gap of about 0.060 inches. Forming air for meltblowing the blend was supplied to the air passageways at a temperature of about 337 degrees Centigrade and at a pressure of about 2.0 pounds per square inch, gage. The viscosity of the blend was calculated at being in excess of 474 poise in the capillaries.

EXAMPLE XXIX

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657), and 40 percent, by weight, of a polypropylene (obtained from Eastman Chemical Products, Inc. under the trade designation Epolene N-15 wax).

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.113 inches. The blend was extruded through the capillaries at a rate of about 0.31 grams per capillary per minute at a temperature of about 161 Centigrade. The extrusion pressure exerted upon the blend in the die tip was measured as fluctuating between about 295 and 451 pounds per square inch, gage. The die tip configuration was adjusted so that it extended about 0.010 inches (0.010 inch die tip stick-out) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 210 degrees Centigrade and at a pressure of about 2.0 pounds per square inch, gage. The viscosity of the blend was calculated in fluctuating between about 260 and 550 poise in the capillaries. The meltblown fibers thus formed were blown onto a forming screen which was approximately 12 inches from the die tip.

EXAMPLE XXX

A fibrous nonwoven elastic web was formed by meltblowing a blend of 60 percent, by weight, of an A-B-A' block copolymer having polystyrene "A" and "A'" endblocks and a poly(ethylene-butylene) "B" midblock (obtained from the Shell Chemical Company under the trade designation KRATON GX 1657), and 40 percent, by weight, of a polypropylene (obtained from Eastman Chemical Products, Inc. under the trade designation Epolene N-15 wax).

Meltblowing of the fibrous nonwoven elastic web was accomplished by extruding the blend of materials through a 0.75 inch Brabender extruder and through a meltblowing die having nine extrusion capillaries per lineal inch of die tip. That is, extruder/die arrangement B4, as defined herein, was utilized. The capillaries each had a diameter of about 0.0145 inches and a length of about 0.133 inches. The blend was extruded through the capillaries at a rate of about 0.31 grams per capillary per minute at a temperature of about 172 degrees Centigrade. The extrusion pressure exerted upon the blend in the die tip was measured as fluctuating between about 155 and 327 pounds per square inch, gage. Accordingly, the example was aborted and sample material was not gathered. The die tip configuration was adjusted so that it extended about 0.010 inches (0.010 inch die tip stick-out) beyond the plane of the external surface of the lips of the air plates which form the air passageways on either side of the capillaries. The air plates were adjusted so that the two air passageways, one on each side of the extrusion capillaries, formed air passageways of a width or gap of about 0.060 inches. Forming air for meltblowing the blend was supplied to the air passageways at a temperature of about 213 degrees Centigrade and at a pressure of about 2.0 pounds per square inch, gage. The viscosity of the blend was calculated as fluctuating between about 496 and 758 poise in the capillaries.

TABLE XVI, below, summarizes the process conditions of Examples 24 through 30.

TABLE XVI

| Example | 24 | 25 | 26 | 27 | 28 | 29 | 30 |
|---|---|---|---|---|---|---|---|
| Extruder/Die Arrangement[1] | B4 | B4 | B4 | B4 | B4 | B4 | B4 |
| Material[2] | 60A/40D | 60A/40E | 60A/20D/20E | 60A/20D/20E | 60A/20D/20E | 60A/40E | 60A/40E |
| Extrusion Rate[3] | 0.33 | 0.33 | 0.33 | 0.33 | 0.33 | 0.31 | 0.31 |
| Extrusion Temperature[4] | 322 | 322 | 323 | 230 | 221 | 161 | 172 |
| Extrusion Pressure[5] | 265 | 20 | 101 | 190 | 300+ | 295–451 | 155–327 |
| Die Tip Stick-Out[6] | 0.010 | 0.010 | 0.010 | 0.010 | 0.010 | 0.010 | 0.010 |
| Air Passageway Gap[7] | 0.060 | 0.060 | 0.060 | 0.060 | 0.060 | 0.060 | 0.060 |
| Air Temperature[8] | 337 | 337 | 337 | 337 | 337 | 210 | 213 |
| Air Pressure[9] | 2.0 | 2.0 | 2.0 | 2.0 | 2.0 | 2.0 | 2.0 |
| Material Viscosity[10] | 419 | 32 | 159 | 300 | 474+ | 496–758 | 260–550 |
| Distance[11] Die-Tip to Forming Screen | 12 | 12 | 12 | 12 | 12 | 12 | 12 |

The following footnotes apply to Table XVI:
[1]as defined herein
[2]A = KRATON GX 1657 (Shell), lot C
D = polypropylene PC-973 (Himont)
E = polypropylene Epolene N-15 wax (Eastman)
90A/10B = 90 percent, by weight, A blended with 10 percent, by weight, of B
[3]in grams per capillary per minute
[4]in degrees Centigrade
[5]in pounds per square inch, gage in the capillaries
[6]negative values indicate recessed die tip arrangement, in inches
[7]in inches
[8]in degrees Centigrade
[9]in pounds per square inch, gage
[10]in poise
[11]in inches The elastomeric characteristics of the fibrous nonwoven webs formed in examples 24, 25, 26, 27 and 29 were measured. The testing was accomplished by utilization of an Instron tensile tester model 1122, which elongated each sample, at a rate of five (5) inches per minute, 100 percent, that is 200 percent of the original unstretched machine direction length and then allowed the sample to return to an unstretched condition. This procedure was repeated three (3) times and then each sample was elongated to break or tear. Each sample was two (2) inches wide (transverse machine direction) by three (3) inches long (machine direction) and the intial jaw separation on the tester was set at one (1) inch. The samples were placed lengthwise in the tester. The data which was obtained is tabulated in Table XVII below.

TABLE XVII

| Example | Stretch Number | MD Strip Tensile[1] | Energy[2] |
|---|---|---|---|
| 24 | 1 | 4.048 | 1.72 |
| 24 | 2 | 3.168 | 0.73 |
| 24 | 3 | 3.155 | 0.73 |
| 24 | 4 | 3.223 | 0.50 |
| 24 | [3]to break | 6.670 | 19.23 |
|  | (736%) |  |  |
| 25 (all data example 25)[4] | 1 | 2.35 | 1.05 |
| 25 | 2 | 2.13 | 0.39 |
| 25 | 3 | 2.05 | 0.35 |
| 25 | 4 | 2.00 | 0.32 |
| 25 | [3]to break | 2.73 | 2.78 |
|  | (280%) |  |  |
| 26 (all data example 26)[4] | 1 | 2.67 | 1.20 |
| 26 | 2 | 2.57 | 0.54 |
| 26 | 3 | 2.52 | 0.49 |
| 26 | 4 | 2.47 | 0.46 |
| 26 | [3]to break | 5.17 | 14.67 |
|  | (775%) |  |  |
| 27 | 1 | 1.68 | 0.66 |
| 27 | 2 | 1.62 | 0.37 |
| 27 | 3 | 1.58 | 0.35 |
| 27 | 4 | 1.55 | 0.33 |
| 27 | [3]to break | 4.21 | 11.83 |
|  | (854%) |  |  |
| 29 | 1 | 0.70 | 0.23 |
| 29 | 2 | 0.64 | 0.08 |
| 29 | 3 | 0.61 | 0.11 |
| 29 | 4 | 0.61 | 0.11 |
| 29 | [3]to break | 0.70 | 0.19 |
|  | (110%) |  |  |

Footnotes for Table XVII
[1]in pounds per two inch wide sample and reported as an average of four (4) replicate measurements unless otherwise stated with the average then being normalized to a 100 gram per square meter material according to the formula reported value =

$$(\text{average value}) \times \left(\frac{100}{\text{actual basis weight}}\right).$$

[2]in inch-pounds and reported as an average of four (4) replicate measurements unless otherwise stated with the average then being normalized to a 100 gram per squared meter material according to the formula of the immediately preceding footnote 1.
[3]as a percentage increase of the length of the original unstredtched sample and reported as an average of four (4) replicate measurements unless otherwise stated. For example, 100 percent would equal twice the length of the original unstretched sample.
[4]average of five (5) replicate samples.

Examples 28, 29 and 30 exemplify the extreme lower limits of using polypropylene materials since the high pressures encountered and the wide fluctuation in the pressure indicate that the polypropylene material was probably beginning to solidify. Thus surging of the blend which would account for the pressure fluctuations would be expected. Specific note should be made of the low viscosity of 32 poise encountered in Example 25.

The nonwoven elastomeric webs of the present invention, whether comprising 100 percent elastomeric fibers or, for example coformed blends of elastomeric and other fibers, find widespread application in providing elasticized fabrics whether used by themselves or bonded to other materials. Potential uses include disposable garments and articles, by which is meant garments and articles designed to be discarded after one or a few uses rather than being repeatedly laundered and reused.

This case is one of a group of cases which are being filed on the same date. The group includes application Ser. No. 760,449 in the name of M. T. Morman and entitled "Composite Nonwoven Elastic Web"; application Ser. No. 760,445 in the name of M. T. Morman entitled "Gathered Fibrous Nonwoven Web"; application Ser. No. 760,698 in the name of M. T. Morman and T. J. Wisneski entitled "Polyolefin-Containing Extrudable Compositions and Methods for Their Formation Into Elastomeric Products"; application Ser. No. 760,438 in the name of M. T. Morman and T. J. Wisneski entitled "Elasticized Garment and Method of Making the Same"; application Ser. No. 760,366 in the name of M. T. Morman and T. J. Morman and T. J. Wisneski entitled "High Temperature Method of Making Elastomeric Materials and Materials Obtained Thereby," application Ser. No. 760,437 in the name of M. J. Vander Wielen and J. D. Taylor entitled "Composite Elastomeric Material and Process for Making the Same," and application Ser. No. 760,691 in the name of William B. Haffner, Michael T. Morman and T. J. Wisneski entitled "Block Copolymer—Polyolefin Elastomeric Films. The subject matter of all of these applications is hereby incorporated by reference.

While the invention has been described in detail with respect to specific preferred embodiments thereof, it will be appreciated that those skilled in the art, upon attaining an understanding of the foregoing, may readily conceive of alterations to and variations of the preferred embodiments. Such alterations and variations are believed to fall within the scope and spirit of the invention and the appended claims.

What is claimed is:

1. A fibrous nonwoven elastomeric web including microfibers, said microfibers comprising:
    at least about 10 percent, by weight, of an A-B-A' block copolymer where "A" and "A'" are each a thermoplastic endblock which comprises a styrenic moiety and where "B" is an elastomeric poly(ethylene-butylene) midblock, and
    from greater than 0 percent, by weight, up to about 90 percent, by weight, of a polyolefin which, when blended with the A-B-A' block copolymer and subjected to an effective combination of elevated temperature and elevated pressure conditions, is adapted to be extruded, in blended form, with the A-B-A' block copolymer.

2. The elastomeric web according to claim 1, wherein the "A" and "A'" endblocks of the block copolymer are selected from the group consisting of polystyrene and polystyrene homologs.

3. The elastomeric web according to claim 2, wherein the "A" and "A'" endblocks of the block copolymer are identical.

4. The elastomeric web according to claim 2, wherein the "A" and "A'" endblocks of the block copolymer are selected from the group consisting of polystyrene and poly(alpha-methylstyrene).

5. The elastomeric web according to claim 1, wherein the polyolefin is selected from the group consisting of at least one polymer selected from the group consisting of polyethylene, polypropylene, polybutene, ethylene copolymers, propylene copolymers and butene copolymers.

6. The elastomeric web according to claim 5, wherein the polyolefin is a blend of two or more polymers selected from the group consisting of polyethylene, polypropylene, polybutene, ethylene copolymers propylene copolymers and butene copolymers.

7. The elastomeric web according to claim 1, wherein the polyolefin is polyethylene.

8. The elastomeric web according to claim 7, wherein the polyethylene has a density of about 0.903 grams per cubic centimeter.

9. The elastomeric web according to claim 8, wherein the polyethylene has a Brookfield Viscosity, cP at 150 degrees Centigrade of about 8500 and at 190 degrees Centigrade of about 3300 when measured in accordance with ASTM D 3236, a number average molecular weight (Mn) of about 4,600, a weight average molecular weight (Mw) of about 22,400, a Z average molecular weight (Mz) of about 83,300 and a polydispersity (Mw/Mn) of about 4.87.

10. The elastomeric web according to claim 1, wherein the polyolefin is polypropylene.

11. The elastomeric web according to claim 10, wherein the polypropylene has a density of about 0.900 grams per cubic centimeter when measured in accordance with ASTM D 792.

12. The elastomeric web according to claim 11, wherein the polypropylene has a meltflow rate obtained in accordance with ASTM D 1238, Condition L, of about 35 grams per ten minutes, a number average molecular weight (Mn) of about 40,100, a weight average molecular weight (Mw) of about 172,000, a Z average molecular weight of about 674,000 and a polydispersity (Mw/Mn) of about 4.29.

13. The elastomeric web according to claim 1, wherein the polyolefin is polybutene.

14. The elastomeric web according to claim 13, wherein the polybutene is an isobutylene-butene copolymer.

15. The elastomeric web according to claim 1, comprising from at least about 20 percent, by weight, to about 95 percent, by weight, of the A-B-A' block copolymer and from at least about 5 percent, by weight, to about 80 percent, by weight, of the polyolefin.

16. The elastomeric web according to claim 1, comprising from at least about 30 percent, by weight, to about 90, by weight, of the A-B-A' block copolymer and from at least about 10 percent, by weight, to about 70 percent, by weight, of the polyolefin.

17. The elastomeric web according to claim 1, comprising from at least 50 percent, by weight, to about 90 percent, by weight, of the A-B-A' block copolymer and from at least about 10 percent, by weight, to about 50 percent, by weight, of the polyolefin.

18. The elastomeric web according to claim 1, comprising from at least about 50 percent, by weight, to about 70 percent, by weight, of the A-B-A' block copolymer and from at least about 30 percent, by weight, to about 50 percent, by weight, of the polyolefin.

19. The elastomeric web according to claim 1, comprising about 60 percent, by weight, of the A-B-A' block copolymer and about 40 percent, by weight, of the polyolefin.

20. A fibrous nonwoven elastomeric web including microfibers, said microfibers comprising:
from at least about 10 percent, by weight, to about 90 percent, by weight, of an A-B-A' block copolymer where "A" and "A'" are each a thermoplastic polystyrene endblock, where "B" is an elastomeric poly(ethylene-butylene) midblock and where the sum of the molecular weight of the A endblock with the molecular weight of the A' endblock is about 14 percent of the molecular weight of the A-B-A' block copolymer, and
from at least about 10 percent, by weight, to about 90 percent, by weight, of a polyethylene having a density of about 0.903 grams per cubic centimeter which, when blended with the A-B-A' block copolymer and subjected to an effective combination of elevated temperature and elevated pressure conditions, is adapted to be extruded, in blended form, with the A-B-A' block copolymer.

21. A fibrous nonwoven elastomeric web including microfibers, said microfibers comprising:
from at least about 50 percent, by weight, to about 90 percent, by weight, of an A-B-A' block copolymer where "A" and "A'" are each a thermoplastic polystyrene endblock and where "B" is an elastomeric poly(ethylene-butylene) midblock, and
from at least about 10 percent, by weight, to about 50 percent, by weight, of a polyethylene having a Brookfield Viscosity, cP at 150 degrees Centigrade of about 8500 and at 190 degrees Centigrade of about 3300 when measured in accordance with ASTM D 3236 and a density of about 0.903 grams per cubic centimeter which, when blended with the A-B-A' block copolymer and subjected to an effective combination of elevated temperature and elevated pressure conditions, is adapted to be extruded, in blended form, with the A-B-A' block copolymer.

22. The elastomeric web according to claim 21, wherein the sum of the molecular weight of A with the molecular weight of A' is from about 14 percent to about 29 percent of the molecular weight of the A-B-A' block copolymer.

23. A fibrous nonwoven elastomeric web consisting essentially of microfibers consisting essentially of:
from at least about 50 percent, by weight, to about 90 percent, by weight, of an A-B-A' block copolymer where "A" and "A'" are each a thermoplastic polystyrene endblock and where "B" is an elastomeric poly(ethylene-butylene) midblock and
from about 10 percent, by weight, to about 50 percent, by weight, of a polyethylene having a Brookfield Viscosity, cP at 150 degrees Centigrade of about 8500 and at 190 degrees Centigrade of about 3300 when measured in accordance with ASTM D 3236 and a density of about 0.903 grams per cubic centimeter which, when blended with the A-B-A' block copolymer and subjected to an effective combination of elevated temperature and elevated pressure conditions, is adapted to be extruded, in blended form, with the A-B-A' block copolymer.

24. The elastomeric web according to claim 23, wherein the sum of the molecular weight of A with the molecular weight of A' is from about 14 percent to about 29 percent of the molecular weight of the A-B-A' block copolymer.

25. A conformed fibrous nonwoven elastomeric web including:
at least about 20 percent, by weight, of a fibrous nonwoven elastomeric web of microfibers, said microfibers comprising:
at least about 10 percent, by weight, of an A-B-A' block copolymer where "A" and "A'" are each a thermoplastic endblock which includes a styrenic moiety and where "B" is an elastomeric poly(ethylene-butylene) midblock; and
from greater than 0 percent, by weight, up to about 90 percent, by weight, of a polyolefin which, when blended with the A-B-A' block copolymer and subjected to an effective combination of elevated temperature and elevated pressure conditions, is adapted to be extruded, in blended form, with the A-B-A' block copolymer; and
from greater than 0 percent, by weight, to about 80 percent, by weight, of at least one secondary fiber generally uniformly distributed throughout the fibrous nonwoven elastomeric web.

26. The coformed elastomeric web according to claim 25, wherein the "A" and "A'" endblocks of the block copolymer are selected from the group consisting of polystyrene and polystyrene homologs.

27. The coformed elastomeric web according to claim 26, wherein the "A" and "A'" endblocks of the block copolymer are identical.

28. The coformed elastomeric web according to claim 25, wherein the "A" and "A'" endblocks of the block copolymer are selected from the group consisting of polystyrene and poly(alpha-methylstyrene).

29. The coformed elastomeric web according to claim 25, wherein the polyolefin is selected from the group consisting of at least one polymer selected from the group consisting of polyethylene, polypropylene, polybutene, ethylene copolymers, propylene copolymers and butene copolymers.

30. The coformed elastomeric web according to claim 29, wherein the polyolefin is a blend of two or more polymers selected from the group consisting of polyethylene, polypropylene, polybutene, ethylene copolymers propylene copolymers and butene copolymers.

31. The coformed elastomeric web according to claim 25, wherein the polyolefin is polyethylene.

32. The coformed elastomeric web according to claim 31, wherein the polyethylene has a density of about 0.903 grams per cubic centimeter.

33. The coformed elastomeric web according to claim 32, wherein the polyethylene has a Brookfield Viscosity, cP at 150 degrees Centigrade of about 8500 and at 190 degrees Centigrade of about 3300 when measured in accordance with ASTM D 3236, a number average molecular weight (Mn) of about 4,600, a weight average molecular weight (Mw) of about 22,400, a Z average molecular weight (Mz) of about 83,300 and a polydispersity (Mw/Mn) of about 4.87.

34. The coformed elastomeric web according to claim 25, wherein the polyolefin is polypropylene.

35. The coformed elastomeric web according to claim 34, wherein the polypropylene has a density of about 0.900 grams per cubic centimeter when measured in accordance with ASTM D 792.

36. The coformed elastomeric web according to claim 35, wherein the polypropylene has a meltflow value obtained in accordance with ASTM D 1238, Condition L, of about 35 grams per ten minutes, a number average molecular weight (Mn) of about 40,100, a weight average molecular weight (Mw) of about 172,000, a Z average molecular weight of about 674,000 and a polydispersity (Mw/Mn) of about 4.29.

37. The coformed elastomeric web according to claim 25, wherein the polyolefin is polybutene.

38. The coformed elastomeric web according to claim 37, wherein the polybutene is an isobutylene-butene copolymer.

39. The coformed elastomeric web according to claim 25, comprising from at least about 20 percent, by weight, to about 95 percent, by weight, of the A-B-A' block copolymer and from at least about 5 percent, by weight, to about 80 percent, by weight, of the polyolefin.

40. The coformed elastomeric web according to claim 25, comprising from at least about 30 percent, by weight, to about 90, by weight, of the A-B-A' block copolymer and from at least about 10 percent, by weight, to about 70 percent, by weight, of the polyolefin.

41. The coformed elastomeric web according to claim 25, comprising from at least 50 percent, by weight, to about 90 percent, by weight, of the A-B-A' block copolymer and from at least about 10 percent, by weight, to about 50 percent, by weight, of the polyolefin.

42. The coformed elastomeric web according to claim 25, comprising from at least about 50 percent, by weight, to about 70 percent, by weight, of the A-B-A' block copolymer and from at least about 30 percent, by weight, to about 50 percent, by weight, of the polyolefin.

43. The coformed elastomeric web according to claim 25, comprising about 60 percent, by weight, of the A-B-A' block copolymer and about 40 percent, by weight, of the polyolefin.

44. The coformed elastomeric web according to claim 25, wherein the secondary fiber comprises from at least about 30 percent, by weight, to about 70 percent, by weight, of the coformed web.

45. The coformed elastomeric web according to claim 25, wherein the secondary fiber comprises from at least about 30 percent, by weight, to about 50 percent, by weight, of the coformed web.

46. A coformed fibrous nonwoven elastomeric web including:
from at least about 30 percent, by weight, to about 70 percent, by weight, of a cohesive fibrous nonwoven elastomeric web of microfibers comprising:
from at least about 10 percent, by weight, to about 90 percent, by weight, of an A-B-A' block copolymer where "A" and "A'" are each a thermoplastic polystyrene endblock, and where "B" is an elastomeric poly(ethylene-butylene) midblock; and where the sum of the molecular weight of the "A" endblock with molecular weight of the "A'" endblock is about 14 percent of the molecular weight of the A-B-A' block copolymer, and
from at least about 10 percent, by weight, to about 90 percent, by weight, of a polyethylene having a density of about 0.903 grams per cubic centimeter which, when blended with the A-B-A' block copolymer and subjected to an effective combination of elevated temperature and elevated pressure conditions, is adapted to be extruded, in blended form, with the A-B-A' block copolymer; and
from at least about 30 percent, by weight, to about 70 percent, by weight, of at least one secondary fiber generally uniformly distributed throughout the cohesive web.

47. A coformed fibrous nonwoven elastomeric web including:
from at least about 30 percent, by weight, to about 70 percent, by weight, of a cohesive fibrous nonwoven elastomeric web of microfibers comprising:
from at least about 50 percent, by weight, to about 90 percent, by weight, of an A-B-A' block copolymer where "A" and "A'" are each a thermoplastic polystyrene endblock and where "B" is an elastomeric poly(ethylene-butylene) midblock, and
from at least about 10 percent, by weight, to about 50 percent, by weight, of a polyethylene having a Brookfield Viscosity, cP at 150 degrees Centigrade of about 8500 and at 190 degrees Centigrade of about 3300 when measured in accordance with ASTM D 3236 and a density of about 0.903 grams per cubic centimeter which, when blended with the A-B-A' block copolymer and subjected to an effective combination of elevated temperature and elevated pressure conditions, is adapted to be extruded, in blended form, with the A-B-A' block copolymer; and
from at least about 30 percent, by weight, to about 70 percent, by weight, of at least one secondary fiber generally uniformly distributed throughout the cohesive web.

48. The coformed elastomeric web according to claim 43, wherein the sum of the molecular weight of A with the molecular weight of A' is from about 14 percent to about 29 percent of the molecular weight of the A-B-A' block copolymer.

49. A coformed fibrous nonwoven elastomeric web consisting essentially of:

from at least about 30 percent, by weight, to about 70 percent, by weight, of a cohesive fibrous nonwoven elastomeric web of microfibers comprising:

from at least about 50 percent by weight, to about 90 percent, by weight, of an A-B-A' block copolymer where "A" and "A'" are each a thermoplastic polystyrene endblock and where "B" is an elastomeric poly(ethylene-butylene) midblock;

from about 10 percent by weight, to about 50 percent, by weight, of a polyethylene having a Brookfield Viscosity, cP at 150 degrees Centigrade of about 8500 and at 190 degrees Centigrade of about 3300 when measured in accordance with ASTM D 3236 and a density of about 0.903 grams per cubic centimeter which, when blended with the A-B-A' block copolymer and subjected to an effective combination of elevated temperature and elevated pressure conditions, is adapted to be extruded, in blended form, with the A-B-A' block copolymer, and from at least about 30 percent, by weight, to about 70 percent, by weight, of at least one secondary fiber generally uniformly distributed throughout the cohesive web.

50. The elastomeric web according to claim 49, wherein the sum of the molecular weight of A with the molecular weight of A' is from about 14 percent to about 29 percent of the molecular weight of the A-B-A' block copolymer.

* * * * *

UNITED STATES PATENT AND TRADEMARK OFFICE
CERTIFICATE OF CORRECTION

PATENT NO. : 4,663,220
DATED : May 5, 1987
INVENTOR(S) : Tony J. Wisneski and Michael T. Morman Page 1 of 3

It is certified that error appears in the above—identified patent and that said Letters Patent is hereby corrected as shown below:

Column 4, line 49 "mpart" should read -- impart --

Column 8, line 15 "term" should read -- terms --

Column 8, line 40 "appalication" should read -- application --

Column 11, line 9 "ads" should read -- as --

Column 11, line 12 "of the capillaries" should read -- of die capillaries --

Column 13, line 23 "themolecular" should read -- the molecular --

Column 13, line 24 "twoendblocks" should read -- two endblocks --

Column 14, line 19 "by the formula" should read -- by the formula: --

Column 17, line 11 "abou" should read -- about --

Column 17, line 61 "die-top" should read -- die-tip --

Column 18, line 21 "at least shown" should read -- at least about --

Column 19, line 24 "pair plate lip" should read -- air plate lip --

Column 28, line 40 "die tips tick-out" should read -- die tip stick-out --

Column 29, line 58 "of the tips" should read -- of the lips --

Column 37 (Table VII) "Viscisity$^{10}$" should read -- Viscosity$^{10}$ --

UNITED STATES PATENT AND TRADEMARK OFFICE
CERTIFICATE OF CORRECTION

PATENT NO. : 4,663,220

DATED : May 5, 1987

Page 2 of 3

INVENTOR(S) : Tony J. Wisneski and Michael T. Morman

It is certified that error appears in the above—identified patent and that said Letters Patent is hereby corrected as shown below:

Column 39, Table VIII, the missing footnote should read -- 1= in grams per ten (10) minutes --.

Column 48, line 48 "web ws" should read -- web was --

Column 49, line 17 "4 percent" should read -- 40 percent --

Column 51, line 46 "pasageways" should read -- passageways --

Column 52, line 24 "in fluctuating" should read -- as fluctuating --

Column 52, line 49 "0.133 inches" should read -- 0.113 inches --

Column 54, line 55 (Footnote 2) "squared" should read -- square --

Column 54, line 65 "pressure" should read -- pressures --

Column 55, line 28 "M. T. Morman and T. J. Morman and T. J. Wisneski" should read -- M. T. Morman and T. J. Wisneski --

Signed and Sealed this

Sixteenth Day of February, 1988

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,663,220

DATED : May 5, 1987

INVENTOR(S) : Tony J. Wisneski et al

Page 3 of 3

It is certified that error appears in the above-identified patent and that said Letters Patent is hereby corrected as shown below:

Column 58, line 16 "conformed" should read -- coformed --.

Signed and Sealed this

Sixteenth Day of February, 1988

Attest:

DONALD J. QUIGG

Attesting Officer

Commissioner of Patents and Trademarks